(12) United States Patent
Serizawa et al.

(10) Patent No.: US 7,596,676 B2
(45) Date of Patent: Sep. 29, 2009

(54) METHOD OF INHERITING INFORMATION IDENTIFYING VIRTUAL VOLUME AND STORAGE SYSTEM USING THE SAME

(75) Inventors: Kazuyoshi Serizawa, Tama (JP); Yoshiaki Eguchi, Yokohama (JP); Yasutomo Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 219 days.

(21) Appl. No.: 11/322,126

(22) Filed: Dec. 30, 2005

(65) Prior Publication Data

US 2007/0101097 A1  May 3, 2007

(30) Foreign Application Priority Data

Oct. 28, 2005  (JP) ............... 2005-314099

(51) Int. Cl.
*G06F 12/00* (2006.01)
*G06F 12/02* (2006.01)
*G06F 12/08* (2006.01)

(52) U.S. Cl. .............. 711/203; 711/6; 709/208
(58) Field of Classification Search ............ 711/203, 711/6; 709/208
See application file for complete search history.

(56) References Cited

U.S. PATENT DOCUMENTS

| | | | |
|---|---|---|---|
| 6,654,830 B1 * | 11/2003 | Taylor et al. | 710/74 |
| 6,826,613 B1 * | 11/2004 | Wang et al. | 709/227 |
| 6,895,483 B2 * | 5/2005 | Eguchi et al. | 711/165 |
| 7,035,882 B2 * | 4/2006 | Takeda et al. | 707/205 |
| 7,062,624 B2 * | 6/2006 | Kano | 711/165 |
| 7,100,016 B2 * | 8/2006 | Yamamoto et al. | 711/170 |
| 7,149,859 B2 * | 12/2006 | Fujibayashi | 711/162 |
| 7,200,664 B2 * | 4/2007 | Hayden | 709/226 |

(Continued)

FOREIGN PATENT DOCUMENTS

EP  1 439 452 A2  8/2003

(Continued)

OTHER PUBLICATIONS

T. Anderson, M. Dahlin, J. Neefe, D. Patterson, D. Roselli, and R. Wang: Serverless network file systems. In SOSP'95, 1995.*

*Primary Examiner*—Sanjiv Shah
*Assistant Examiner*—Samuel Dillon
(74) *Attorney, Agent, or Firm*—Stites & Harbison P.L.L.C.; Juan Carlos A. Marquez, Esq.

(57) ABSTRACT

With the migration of a logical volume between virtualization apparatuses, there has been a need to change the setting of a host computer in order to access a migration destination logical volume. In a control method for a computer system including a host computer, one or more storage systems, and plural virtualization apparatuses, a first virtualization apparatus includes a first memory and manages a first logical volume to which the host computer issues an access request, and a second virtualization apparatus includes a second memory and manages a second logical volume to which the host computer issues an access request, wherein the control method associates a first real storage area on the storage system, which has been associated with the first logical volume, with the second logical volume, and stores, in the second memory, first identification information that uniquely identifies the first logical volume within the computer system.

13 Claims, 22 Drawing Sheets

U.S. PATENT DOCUMENTS

| | | | |
|---|---|---|---|
| 7,209,986 B2 * | 4/2007 | Ohno et al. | 710/74 |
| 7,484,208 B1 * | 1/2009 | Nelson | 718/1 |
| 2004/0143832 A1 | 7/2004 | Yamamoto et al. | |
| 2005/0076157 A1 | 4/2005 | Serizawa et al. | |
| 2005/0246491 A1 | 11/2005 | Yamamoto et al. | |

FOREIGN PATENT DOCUMENTS

| | | |
|---|---|---|
| JP | 2005-115506 | 10/2003 |

* cited by examiner

VOLUME MANAGEMENT TABLE
( VIRTUALIZATION APPARATUS 13A )

| VOLUME NO. WITHIN VIRTUALIZATION APPARATUS | UNIT SERIAL NO. OF CREATION SOURCE VIRTUALIZATION APPARATUS | VOLUME NO. AT CREATION TIME |
|---|---|---|
| VOL- A | - | - |
| VOL- B | U1 | - |

FIG. 3A

VOLUME MANAGEMENT TABLE
( VIRTUALIZATION APPARATUS 13B )

| VOLUME NO. WITHIN VIRTUALIZATION APPARATUS | UNIT SERIAL NO. OF CREATION SOURCE VIRTUALIZATION APPARATUS | VOLUME NO. AT CREATION TIME |
|---|---|---|
| VOL- C | U1 | VOL- B |

FIG. 3B

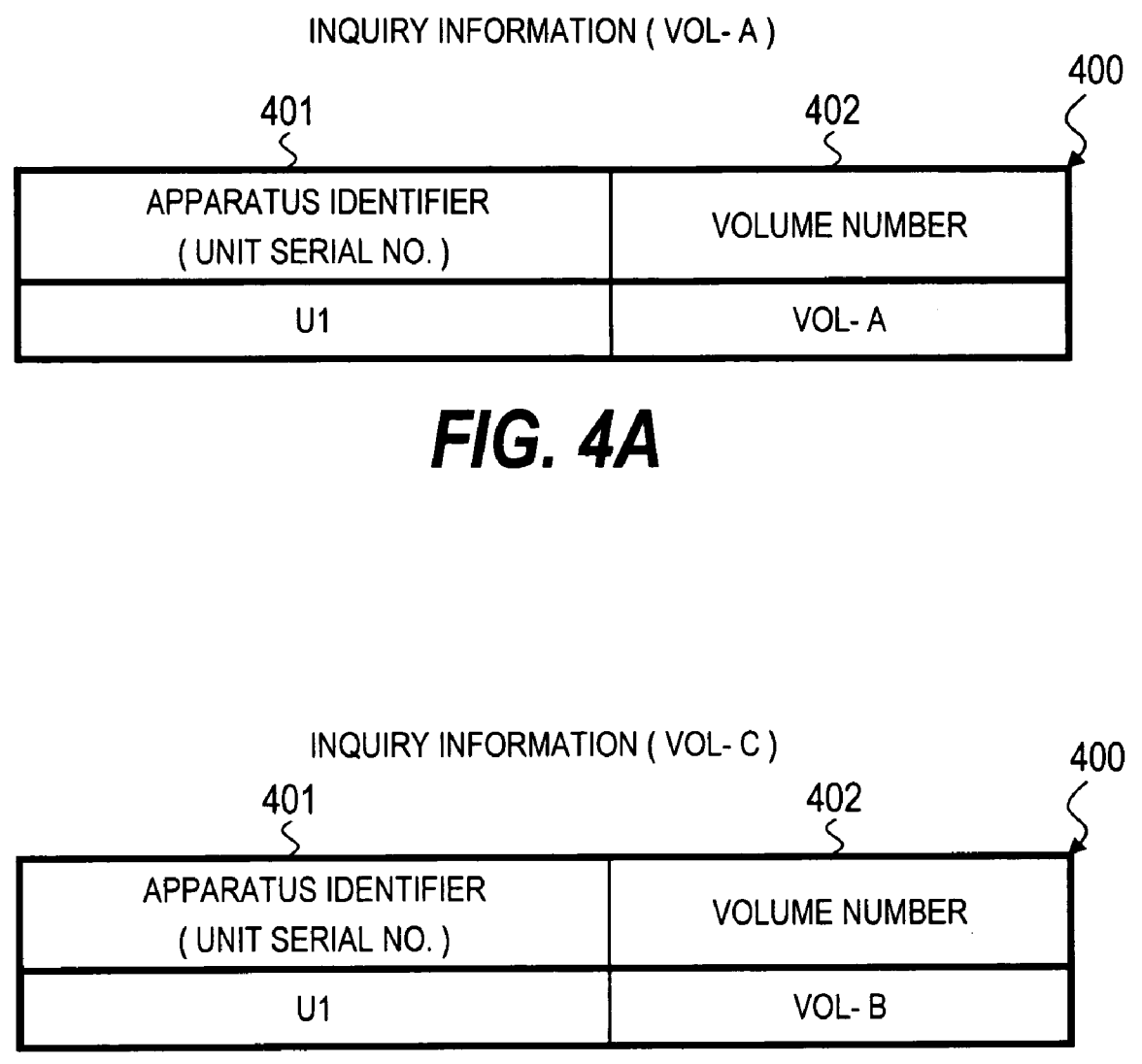

INQUIRY INFORMATION ( VOL- A )

| APPARATUS IDENTIFIER (UNIT SERIAL NO.) | VOLUME NUMBER |
|---|---|
| U1 | VOL- A |

FIG. 4A

INQUIRY INFORMATION ( VOL- C )

| APPARATUS IDENTIFIER (UNIT SERIAL NO.) | VOLUME NUMBER |
|---|---|
| U1 | VOL- B |

FIG. 4B

DEVICE MANAGEMENT TABLE

| APPARATUS IDENTIFIER (UNIT SERIAL NO.) 501 | VOLUME NUMBER 502 | VIRTUAL DEVICE NAME 503 | IDENTIFIER ON SAN 504 |
|---|---|---|---|
| U1 | VOL-A | /dev/dsk/vol 0001 | 0x90abcdef |
| U1 | VOL-B | /dev/dsk/vol 0002 | 0x12345678 |

MOUNT TABLE

| VIRTUAL DEVICE NAME 601 | FILENAME FIRST CHARACTER STRING 602 |
|---|---|
| /dev/dsk/vol 0001 | /home 1 |
| /dev/dsk/vol 0002 | /home 2 |

METHOD OF INHERITING INFORMATION IDENTIFYING VIRTUAL VOLUME AND STORAGE SYSTEM USING THE SAME

CLAIM OF PRIORITY

The present application claims priority from Japanese application JP2005-314099 filed on Oct. 28, 2005, the content of which is hereby incorporated by reference into this application.

BACKGROUND

The technology disclosed in this specification is relates to a computer system including one or more storage systems, and more specifically, relates to a volume migration in a virtualization environment in which the storage area is virtualized.

In a computer system in which a host computer and a storage system connect with each other via a storage area network (SAN), there is known a technology using a storage area on the storage system as a virtual volume. According to the technology disclosed in JP 2005-115506 A, for example, the computer system includes a virtualization apparatus (virtualization switch 11) that provides a virtual volume. The virtualization apparatus associates one or more real areas on the storage system with a virtual volume (virtual volume 100). The host computer issues an input/output request to the virtual volume. The virtualization apparatus converts the input/output request into the input/output request relative to a real area corresponding to the virtual volume and transfers the converted request.

SUMMARY

In the case of a computer system including plural virtualization apparatuses, a virtual volume that one of the virtualization apparatuses is managing may migrate to another virtualization apparatus. The volume migration is carried out by releasing the correspondence between the migration source virtual volume and the real area corresponding thereto, and by associating the real area with the migration destination virtual volume. Accordingly, the migration destination virtual volume is associated with the real area having been associated with the migration source virtual volume. However, the host recognizes that these volumes are different from each other. Thus, a system administrator needs to change the host setting so that the host recognizes that these volumes are identical to each other.

A representative invention disclosed in this application includes a control method for a computer system including a host computer, one or more storage system, and plural virtualization apparatuses, the host computer being coupled to the plural virtualization apparatuses via a network, and the plural virtualization apparatuses being coupled to the one or more storage systems via the network, in which a first virtualization apparatus includes a first memory and manages a first logical volume to which the host computer issues an access request, and a second virtualization apparatus includes a second memory and manages a second logical volume to which the host computer issues an access request. The control method associates a first real storage area on the storage system, which has been associated with the first logical volume, with the second logical volume, and stores, in the second memory, first identification information that uniquely identifies the first logical volume within the computer system.

With an embodiment of this invention, when the virtual volume migrates between the virtualization apparatuses and although the system administrator does not change the host setting, the host can access a file on the migration destination volume.

BRIEF DESCRIPTION OF THE DRAWINGS

FIG. 3A is an explanatory diagram showing a logical volume management table of a migration source virtualization apparatus of the first embodiment of this invention;

FIG. 3B is an explanatory diagram showing a logical volume management table of a migration destination virtualization apparatus of the first embodiment of this invention;

FIG. 4A is an explanatory diagram showing an example of the inquiry information of the first embodiment of this invention;

FIG. 4B is an explanatory diagram showing another example of the inquiry information of the first embodiment of this invention;

FIG. 5 is an explanatory diagram showing a device management table of the first embodiment of this invention;

FIG. 6 is an explanatory diagram showing a mount table of the first embodiment of this invention;

DESCRIPTION OF THE PREFERRED EMBODIMENTS

Hereinafter, the embodiments of this invention will be described with reference to the drawings.

Figure 1:
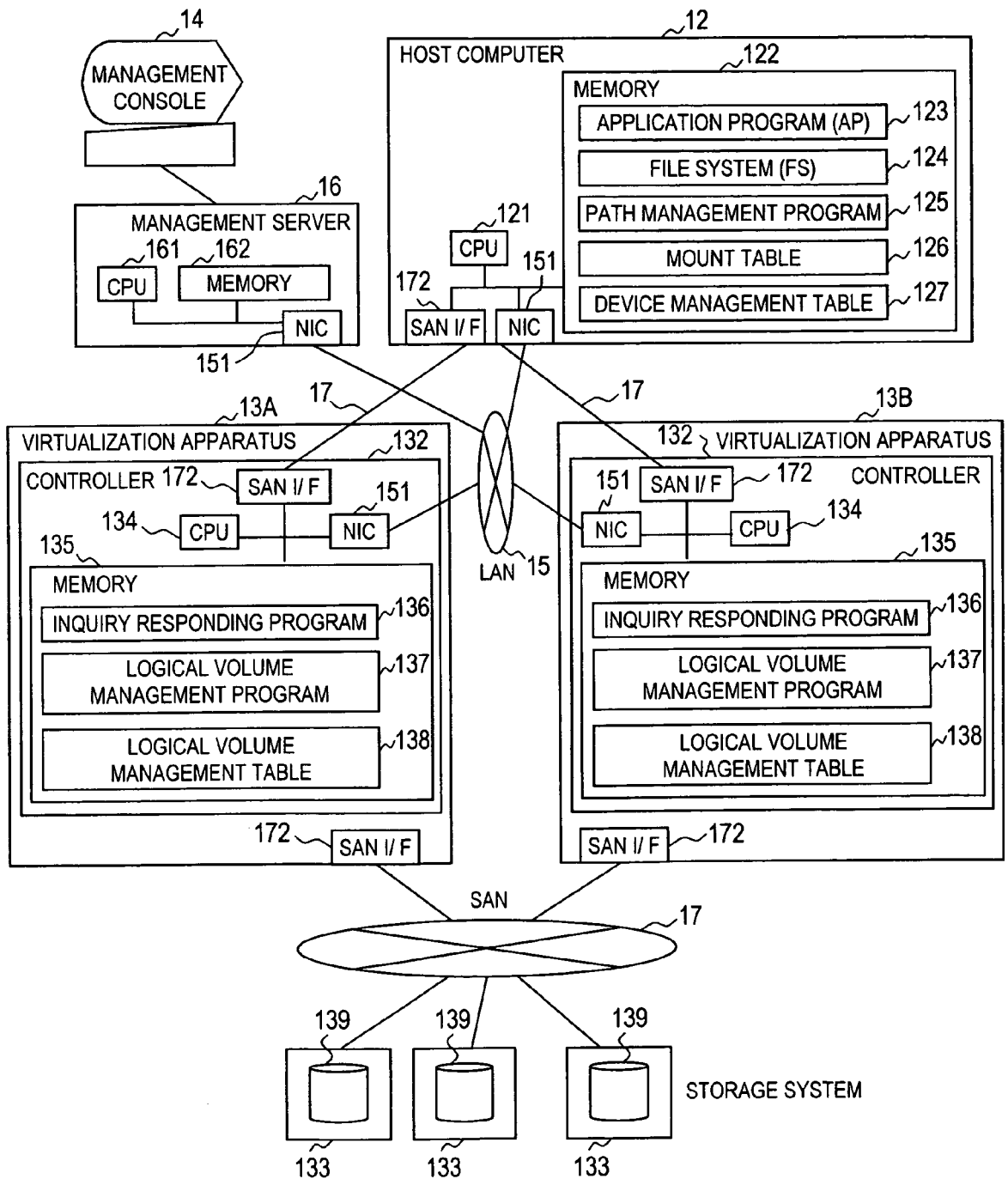
FIG. 1 is a block diagram showing the configuration of a computer system of a first embodiment of this invention.

FIG. 1 is a block diagram showing the configuration of a computer system of a first embodiment of this invention.

The computer system of this embodiment includes a virtualization apparatus 13A, a virtualization apparatus 13B, a host computer 12, a management server 16, a management console 14, and one or more storage systems 133.

A local area network (LAN) 15 is a communication path used for interconnecting the management server 16, the host computer 12, the virtualization apparatuses 13A and 13B to allow them to communicate with each other.

A storage area network (SAN) 17 is a communication path used for interconnecting the host computer 12, the virtualization apparatuses 13A, 13B, and the individual storage systems 133 to allow them to send and receive the data. On the SAN 17 of the embodiment, the communication is carried out, for example, based on the fibre channel (FC) protocol.

The host computer 12, the virtualization apparatuses 13A and 13B connect with each other via the storage area network (SAN) 17. Further, the virtualization apparatuses 13A, 13B and the individual storage systems 133 connect with each other via the SAN 17.

The virtualization apparatus 13A is a device that provides a storage area within the storage system 133 as a virtualized logical volume 131 (see FIG. 2) to the host computer 12. The logical volume 131 will be described below with reference to FIG. 2.

The virtualization apparatus 13A includes a controller 132 and a SAN interface (SAN_I/F) 172.

The controller 132 includes a CPU 134, a memory 135, a network interface card (NIC) 151 and the SAN interface 172.

The CPU 134 is a processor that executes programs stored in the memory 135.

The memory 135, for example a semiconductor memory, stores various programs that the CPU 134 executes and a table to which these programs refer. The memory 135 of the embodiment stores at least an inquiry responding program 136, a logical volume management program 137 and a logical volume management table 138.

The inquiry responding program 136 is a program that, when the virtualization apparatus 13A receives an inquiry request (INQUIRY command of SCSI, operation code 12h) from the host computer 12, creates inquiry information and sends the created inquiry information to the host computer 12. The inquiry information is more specifically the response information of a SCSI INQUIRY command. Preferably, it is a vendor-specific table containing a portion of Standard INQUIRY data defined by the SCSI-1 standard, or Vital product data parameters defined by the SCSI-2 standard, and more preferably, Page code 80h (Unit Serial Number page) or Page code COh-FFh.

The inquiry request is a request that the host computer 12 sends to the virtualization apparatus 13A in order to acquire information (inquiry information) relating to the logical volume 131 of the virtualization apparatus 13A.

The inquiry information includes the information relating to the logical volume 131. More specifically, the inquiry information includes the unit serial number of the virtualization apparatus 13A and the logical volume number of logical volume 131 as the identification information that uniquely identifies the logical volume 131 within the computer system. The host computer 12 refers to the inquiry information to identify the individual logical volumes 131. The inquiry information will be described in detail below (see FIGS. 4A and 4B).

The logical volume management program 137 is a program for executing such operations as the creation, deletion, renaming, migration of the logical volume 131 in response to an instruction from the management server 16 and the like.

The logical volume management table 138 is a table for managing the logical volumes 131. Registered in the logical volume management table 138 is the information relating to the logical volumes 131 that the virtualization apparatus 13A provides to the host computer 12.

The programs and the table will be described below in detail.

The NIC 151 is an interface connecting with the LAN 15 to communicate with the management server 16 and other related modules.

The SAN interface 172 is an interface connecting with the SAN 17 to communicate with the host computer 12, the virtualization apparatus 13B and the storage systems 133. More specifically, the SAN interface 172 is a host bus adapter (HBA) of the fibre channel (FC). Incidentally, it is allowable to use other protocols than the FC (e.g. SCSI, iSCSI or Infini-Band) for the connection between the host computer 12, the virtualization apparatus 13A and the storage systems 133. In this case, the SAN interface 172 may be the adapter corresponding to these protocols.

The configuration of the virtualization apparatus 13B is the same as that of the virtualization apparatus 13A. Thereby, the description about the configuration of the virtualization apparatus 13B will be omitted. In the following description, the virtualization apparatuses 13A and 13B are collectively referred to as a virtualization apparatus 13 when they do not specifically need to be differentiated from each other.

The host computer 12 is a computer using the data of the logical volume 131 that the virtualization apparatus 13 provides (i.e. the data stored in the storage area of the storage system 133). The host computer 12 includes a CPU 121, a memory 122, the NIC 151 and the SAN interface 172.

The CPU 121 is a processor for executing the programs stored in the memory 122.

The memory 122, for example a semiconductor memory, stores various programs that the CPU 121 executes and tables to which these programs refer. The memory 122 of the embodiment stores at least an application program (AP) 123, a file system (FS) 124, a path management program 125, a mount table 126 and a device management table 127.

The AP 123 is a program (e.g. a database management program) that executes jobs using the files on a virtual device (not shown). The virtual device is a virtual device that the FS 124 recognizes. The path management program 125 described below associates one virtual device with one logical volume 131.

The FS 124 is a program that associates an area on the virtual device with a file read or written by the AP 123.

The path management program 125 is a program that associates the virtual device with the logical volume 131.

The mount table 126 is a table for managing the correspondence between the virtual device and the name of the file stored in the virtual device. More specifically, the virtual device name and the first character string of the filename given to the file on the virtual device are registered in the mount table 126. The FS 124 refers to the mount table 126.

The device management table 127 is a table for managing the correspondence between the virtual device and the logical volume 131. More specifically, the unit serial number of the virtualization apparatus 13 and the logical volume name, as well as the virtual device name corresponding to them are registered in the device management table 127. The path management program 125 refers to and updates the device management table 127.

The path management program 125, the mount table 126 and the device management table 127 will be described in detail below.

The management server 16 is a computer for confirming and changing the setting of the virtualization apparatus 13.

The management server 16 of the embodiment includes a CPU 161, a memory 162 and the NIC 151.

The CPU 161 is a processor for executing the programs stored in the memory 162.

The memory 162, for example a semiconductor memory, stores various programs that the CPU 161 executes. The memory 162 of the embodiment stores at least the programs (not shown) that issues the requests of the creation, deletion and migration of the logical volume 131 (see FIG. 7A) to the virtualization apparatus 13.

The management console 14 is an input/output terminal that the system administrator uses for operating the management server.

The storage system 133 connects with the virtualization apparatus 13 via the SAN 17. The individual storage system 133 can be handled at least as an independent device. The individual storage systems 133 may be a single disk drive, or a disk array apparatus including plural disk drives. The storage systems 133 each include one or more real volumes 139 (described below). The file data the AP 123 uses is stored in the real volume 139.

Figure 2:
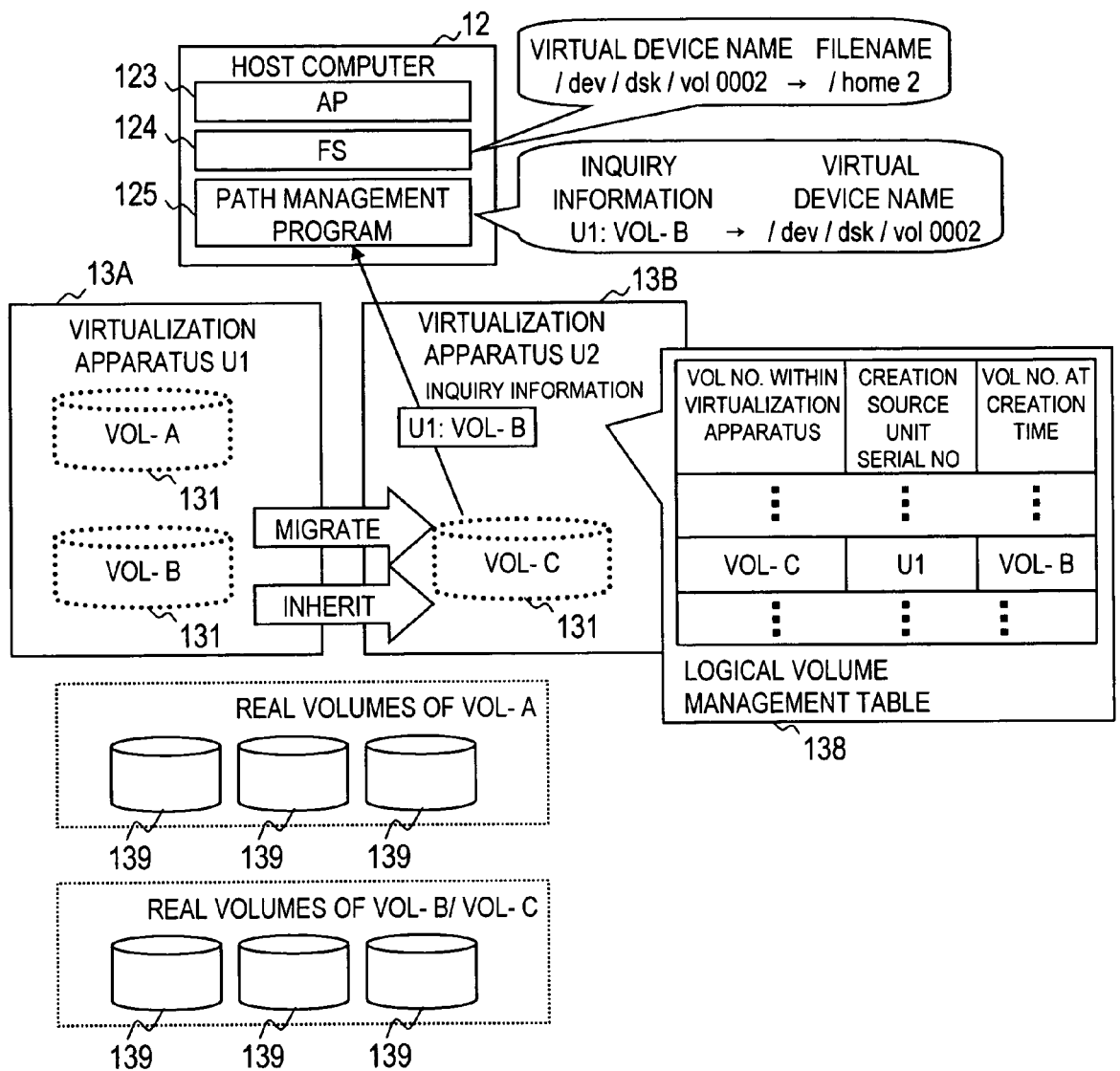
FIG. 2 is an explanatory diagram showing the outline of the first embodiment of this invention.

FIG. 2 is an explanatory diagram showing the outline of the first embodiment of this invention.

The outline of this invention will be described with reference to FIG. 2. The illustration of the hardware configuration shown in FIG. 1 is omitted in FIG. 2.

In FIG. 2, the apparatus identifiers identify the individual virtualization apparatuses 13. The apparatus identifier is, for example, the unit serial number of the virtualization apparatus 13. In the example of FIG. 2, the unit serial number of the virtualization apparatus 13A is "U1", and the unit serial number of the virtualization apparatus 13B is "U2". In the following embodiments, we use the unit serial number as the apparatus identifier, but it is allowable to use any identifiers other than the unit serial number as long as the identifiers uniquely identify the individual virtualization apparatuses 13.

Incidentally, for descriptive convenience, we use the character strings such as "U1" and "U2" as the unit serial numbers. However, the actual unit serial number may be an arbitrary character and numerical string. Further, the unit serial number may include the information (model information) that identifies the model of each individual virtualization apparatus.

In the example of FIG. 2, the two logical volumes 131 are initially set to the virtualization apparatus 13A. The logical volume 131 is a virtual storage area corresponding to one or more real volumes 139 (described below). The virtualization apparatus 13 can provide one or more logical volumes 131 to the host computer 12.

The individual logical volumes 131 can be identified by the logical volume numbers (identifiers). The volume numbers of the two logical volumes 131 of the virtualization apparatus 13A are "VOL-A" and "VOL-B". Hereinafter, the logical volume 131 with the volume number "VOL-A" is simply referred to as "VOL-A". This is the same for the other logical volumes 131.

The individual virtualization apparatuses 13 give unique volume numbers within the individual virtualization apparatuses 13 to the logical volumes 131, respectively. The combination of the unit serial number of the virtualization apparatus 13 and the volume number is used as the identification information that uniquely identifies each of the logical volumes 131 within the computer system.

VOL-A and VOL-B correspond to one or more predetermined real volumes 139, respectively. The real volume 139 is a volume composed of the storage area on the storage system 133, in which the data is actually stored.

The host computer 12 issues an access request to the logical volume 131. The requested access is actually executed relative to the real volume 139 corresponding to the logical volume 131.

For example, when the host computer 12 issues a data writing request relative to VOL-A, the data is actually stored in the real volume 139 corresponding to VOL-A. At this time, it looks from the host computer 12 as if the data were stored in VOL-A of the virtualization apparatus 13A. In the following description, the fact that the data is stored in the real volume 139 corresponding to VOL-A will be simply referred to as "the data is stored in VOL-A". This is the same for VOL-B and VOL-C.

Incidentally, the following description assumes that all of the logical volumes 131 correspond to the real volumes 139. However, the real volume 139 may be recognized as the logical volume 131 by itself.

In the example of FIG. 2, VOL-B migrates to VOL-C of the virtualization apparatus 13B. More specifically, the correspondence between VOL-B and the real volume 139 corresponding to VOL-B is released. Then, the real volume 139 is newly associated with VOL-C. As a result, the real volume 139 corresponding to VOL-C is the same real volume 139 having corresponded to VOL-B. Thus, although VOL-B migrates to VOL-C, the data does not move. However, it looks as if the data having been stored in VOL-B had moved to VOL-C from the host computer 12.

Such a migration of the logical volume 131 is executed, for example, in order to disperse the access load of the virtualization apparatus 13. For example, there is a case in which the host computer 12 issues a large amount of access requests to VOL-A and VOL-B, while a few access requests to the logical volume 131 of the virtualization apparatus 13B. In such a case, the migration of VOL-B to the virtualization apparatus 13B allows a portion of the access load of the virtualization apparatus 13A to be dispersed to the virtualization apparatus 13B. As a result, the data process performance of the whole computer system is improved.

Upon completion of the migration from VOL-B to VOL-C, the access to VOL-B is prohibited. At this moment, the exactly same data as the data having been stored in VOL-B is stored in VOL-C. When the file that the AP 123 uses has been stored in VOL-B, it needs to issue to VOL-C the access request for the AP 123 in order to access the file. Conventionally, the system administrator has needed to manually update the mount table 126 to which the FS 124 refers in order to change the destination of such an access request.

More specifically, when the host computer 12 issued an inquiry request relative to VOL-C, the conventional virtualization apparatus 13B replied the inquiry information composed of the unit serial number "U2" of the virtualization apparatus 13B and the volume name "VOL-C" of VOL-C. Thus, although VOL-B and VOL-C were corresponding to the same real volume 139, the path management program 125 of the host computer 12 recognized VOL-C as the logical volume 131 different from VOL-B, and assigned a different virtual device name from VOL-B, to VOL-C. Thereby, the system administrator needed to release the correspondence between the virtual device name of VOL-B (in the example of FIG. 2, "/dev/dsk/vol0002") and the filename (in the example of FIG. 2, "/home2"), and to update the mount table 126 so as to newly establish the correspondence between the virtual device name of VOL-C (e.g. "dev/dsk/vol0003") and the filename "/home2".

With the first embodiment of this invention, the migration destination VOL-C inherits the unit serial number "U1" of the migration source virtualization apparatus 13A and the logical volume name "VOL-B" of the migration source logical volume 131 (see FIGS. 3A and 3B). Then, the virtualization apparatus 13B replies the inherited "U1" and "VOL-B" to the inquiry request from the host computer 12. Because of this feature, the path management program 125 recognizes that VOL-C is the same logical volume 131 as VOL-B, and assigns to VOL-C the same virtual device name as that of VOL-B. As a result, although the system administrator does not update the mount table 126, the AP 123 can use the file stored in VOL-C.

Incidentally, the implementation of the embodiment requires that the inquiry information relating to the individual logical volumes 131 be unique within the computer system. Thus, after the virtualization apparatus 13B inherits "U1" and "VOL-B" from the virtualization apparatus 13A, the virtualization apparatus 13A cannot give the volume name "VOL-B" to the newly created logical volume 131.

Hereinafter, the tables and programs of the embodiment will be described in detail.

FIG. 3A is an explanatory diagram of a logical volume management table 138 of the migration source virtualization apparatus 13A in the first embodiment of this invention.

This logical volume management table 138 is a table for managing the logical volumes 131 stored in the virtualization apparatus 13A. The example of FIG. 3A shows the logical volume management table 138 after completion of the migration from VOL-B to VOL-C.

The logical volume management table 138 includes a volume number 301 within virtualization apparatus, a unit serial number 302 of creation source virtualization apparatus and a volume number 303 at creation time. Of these, the unit serial number 302 of creation source virtualization apparatus and the volume number 303 at creation time have not been included in the conventional logical volume management table, so that they are added in the embodiment of this invention.

The volume number 301 within virtualization apparatus is the logical volume number of the logical volume 131 stored in the virtualization apparatus 13A.

The virtualization apparatus 13A initially stores the two logical volumes 131, VOL-A and VOL-B (see FIG. 2). At this moment, "VOL-A" and "VOL-B" are registered as the volume numbers 301 within virtualization apparatus. Subsequently, VOL-B migrates to VOL-C, and VOL-B is deleted from the virtualization apparatus 13A.

Conventionally, "VOL-B" has been deleted from the volume number 301 within virtualization apparatus in association with the deletion of VOL-B. However, in the embodiment, "VOL-B" is not deleted from the volume number 301 within virtualization apparatus. This is for preventing the virtualization apparatus 13A from giving the volume number "VOL-B" to the newly created logical volume 131. Because the migration destination VOL-C inherits and uses "U1" and "VOL-B", if the virtualization apparatus 13A gives the volume number "VOL-B" to the newly created logical volume 131, the inquiry information is not unique within the computer system.

When the logical volume 131 migrates from one virtualization apparatus 13 to another virtualization apparatus 13, the unit serial number of the migration source virtualization apparatus 13 is registered for the unit serial number 302 of creation source virtualization apparatus. This unit serial number of the migration source virtualization apparatus 13 is registered by being associated with the volume number of the migrated logical volume 131.

In the example of FIG. 2, VOL-A and VOL-B of the virtualization apparatus 13A are both created by the virtualization apparatus 13A. In this case, the unit serial numbers 302 of creation source virtualization apparatus for VOL-A and VOL-B are initially both blank ("–"). Subsequently, VOL-B migrates to VOL-C, and VOL-B is deleted from the virtualization apparatus 13A. At this time, the unit serial number "U1" of the virtualization apparatus 13A is registered as the unit serial number 302 of creation source virtualization apparatus of VOL-B.

When the logical volume 131 is the migration destination of the logical volume 131 of another virtualization apparatus 13, the migration source logical volume number is stored for the volume number 303 at creation time.

In the example of FIG. 2, neither of VOL-A nor VOL-B is the migration destination of the logical volume 131 of another virtualization apparatus 13. Thus, the volume numbers 303 at creation time for VOL-A and VOL-B are both blank ("–").

FIG. 3B is an explanatory diagram of a logical volume management table 138 of the migration destination virtualization apparatus 13B in the first embodiment of this invention.

This volume management table 138 is a table for managing the logical volume 131 stored in the virtualization apparatus 13B. The example of FIG. 3B shows the logical volume management table 138 after completion of the migration from VOL-B to VOL-C. In FIG. 3B, the description about the same parts as those in FIG. 3A will be omitted.

The virtualization apparatus 13B stores VOL-C (see FIG. 2). Thus, "VOL-C" is registered as the volume number 301 within virtualization apparatus.

VOL-C is a logical volume created as the migration destination of VOL-B of the virtualization apparatus 13B. Thus, the unit serial number "U1" of the migration source virtualization apparatus 13A is registered as the unit serial number 302 of creation source virtualization apparatus of VOL-C. Further, the volume number "VOL-B" of the migration source logical volume 131 is registered as the volume number 303 at creation time of VOL-C.

FIG. 4A is an explanatory diagram showing an example of the inquiry information of the first embodiment of this invention.

FIG. 4A shows inquiry information 400 that the virtualization apparatus 13A replies, when the host computer 12 of FIG. 2 issues the inquiry request relative to VOL-A of the virtualization apparatus 13A.

The inquiry responding program 136 creates the inquiry information 400. The procedure of the process the inquiry responding program 136 executes will be described in detail below (see FIG. 8).

The inquiry information 400 of the embodiment includes a apparatus identifier (unit serial number) 401 and a volume number 402.

In the logical volume management table 138 of the virtualization apparatus 13A, the unit serial number 302 of creation source virtualization apparatus for VOL-A is blank (see FIG. 3A). In this case, the unit serial number "U1" of the virtualization apparatus 13A that manages VOL-A is registered for the apparatus identifier 401, and the volume number "VOL-A" that the virtualization apparatus 13A has given to VOL-A is registered for the volume number 402.

FIG. 4B is an explanatory diagram showing another example of the inquiry information in the first embodiment of this invention.

FIG. 4B shows the inquiry information 400 that the virtualization apparatus 13B replies when the host computer 12 of FIG. 2 issues the inquiry request relative to VOL-C of the virtualization apparatus 13B. In FIG. 4B, the description about the same parts as those in FIG. 4A will be omitted.

As shown in FIG. 2, the virtualization apparatus 13B manages VOL-C. The conventional inquiry responding program 136 registers the unit serial number "U2" of the virtualization apparatus 13B that manages VOL-C and the volume number "VOL-C" that the virtualization apparatus 13B has given to VOL-C, as the apparatus identifier 401 and the volume number 402 respectively. However, the inquiry responding program 136 of the embodiment registers the unit serial number and volume number inherited from the migration source and replies to the host computer 12.

More specifically, the logical volume management table 138 of the virtualization apparatus 13B stores therein "U1" and "VOL-B" for the unit serial number 302 of creation source virtualization apparatus and the volume number 303 at creation time of VOL-C, respectively (see FIG. 3B). In other words, VOL-C is the logical volume 131 created as the migration destination of VOL-B of the virtualization apparatus 13B. Further, "U1" and "VOL-B" are the values the virtualization apparatus 13B has inherited from the migration source virtualization apparatus 13A. In this case, "U1" and "VOL-B" are registered for the apparatus identifier 401 and the volume number 402 respectively.

FIG. 5 is an explanatory diagram showing the device management table 127 of the first embodiment of this invention.

FIG. 5 shows the device management table 127 of the host computer 12 shown in FIG. 2.

The path management program 125 refers to and updates the device management table 127. The procedure of the process the path management program 125 executes will be described below in detail (see FIG. 9).

The device management table 127 includes a apparatus identifier (unit serial number) 501, a volume number 502, a virtual device name 503 and an identifier 504 on SAN.

Registered for the apparatus identifier 501 and the volume number 502 are the values of the inquiry information that the host computer 12 acquired by issuing the inquiry request, respectively. The host computer 12 acquires the unit serial number "U1" and the volume name "VOL-A" from the virtualization apparatus 13A (see FIG. 4A). Thus, "U1" as the apparatus identifier 501 and "VOL-A" as the volume number 502 are registered in a first entry (line) of the device management table 127. Meanwhile, the host computer 12 acquires the unit serial number "U1" and the volume name "VOL-B" from the virtualization apparatus 13B (see FIG. 4B). Thus, "U1" as the apparatus identifier 501 and "VOL-B" as the volume number 502 are registered in a second entry of the device management table 127.

The virtual device name 503 is a name used for the host computer 12 to recognize the logical volume 131 as the virtual device. In the example of FIG. 5, "/dev/dsk/vol0001" is registered as the virtual device name 503 corresponding to VOL-A, and "/dev/dsk/vol0002" is registered as the virtual device name 503 corresponding to VOL-B.

The identifier 504 on SAN is an identifier used for identifying the individual logical volumes 131 on the SAN 17. In the example of FIG. 5, "0x90abcdef" is registered as the identifier on SAN 504 corresponding to VOL-A, and "0x12345678" is registered as the identifier on SAN 504 corresponding to VOL-B.

FIG. 6 is an explanatory diagram showing the mount table 126 of the first embodiment of this invention.

FIG. 6 shows the mount table 126 of the host computer 12 shown in FIG. 2.

The FS 124 refers to the mount table 126. The procedure of the process the FS 124 executes will be described below in detail (see FIG. 10).

The mount table 126 includes a virtual device name 601 and a filename first character string 602.

As shown in FIG. 5, the host computer 12 recognizes the two virtual devices. Thus, the names of the two virtual devices "/dev/dsk/vol0001" and "/dev/dsk/vol0002" are registered for the virtual device name 601 of the mount table 126.

The filename first character string 602 is the first character string of a filename given to a file on each virtual device. In the example of FIG. 6, "/home1" is registered as the filename first character string 602 corresponding to the virtual device name "/dev/dsk/vol0001", and "/home2" is registered as the filename first character string 602 corresponding to the virtual device name "/dev/dsk/vol0002". In this case, for example, the filename "/home2/testuser/filsel.txt" is given to the file on the virtual device with the virtual device name 601 of "/dev/dsk/vol0002". Similarly, the filenames beginning with "/home2" are given to the other files on the virtual device.

The filenames beginning with "/home1" are given to the files on the virtual device with the virtual device name 601 of "/dev/dsk/vol0001".

Next, the processes that the programs of the embodiment execute will be described with reference to the flowcharts. In the following description, the processes that the individual programs execute are actually executed by the CPU 121 and other related modules that execute the programs. More specifically, the CPU 121 of the host computer 12 executes the processes of the FS 124 and the path management program 125. The CPU 134 of the virtualization apparatus 13 executes the processes of the inquiry responding program 136 and the logical volume management program 137.

Further, in the following description, the host computer 12 and the virtualization apparatuses 13 send and receive therebetween the inquiry request and the inquiry information 400 via the SAN interface 172 and the SAN 17. The virtualization apparatuses 13 send and receive therebetween the identification information of the logical volume 131 via the SAN interface 172 and the SAN 17. The virtualization apparatuses 13 may also send and receive therebetween the identification information of the logical volume 131 via the NIC 151 and the LAN 15.

FIGS. 7A to 7E are flowcharts showing the processes of the logical volume management program 137 of the first embodiment of this invention.

The logical volume management program 137 of the embodiment, when receiving the volume creation request, volume deletion request or volume migration request from the management server 16, executes the processes in response to the requests. Further, the logical volume management program 137 of the embodiment, when receiving the volume migration request from another virtualization apparatus 13, executes the process in response to the request. These processes will be described below.

Figure 7A:
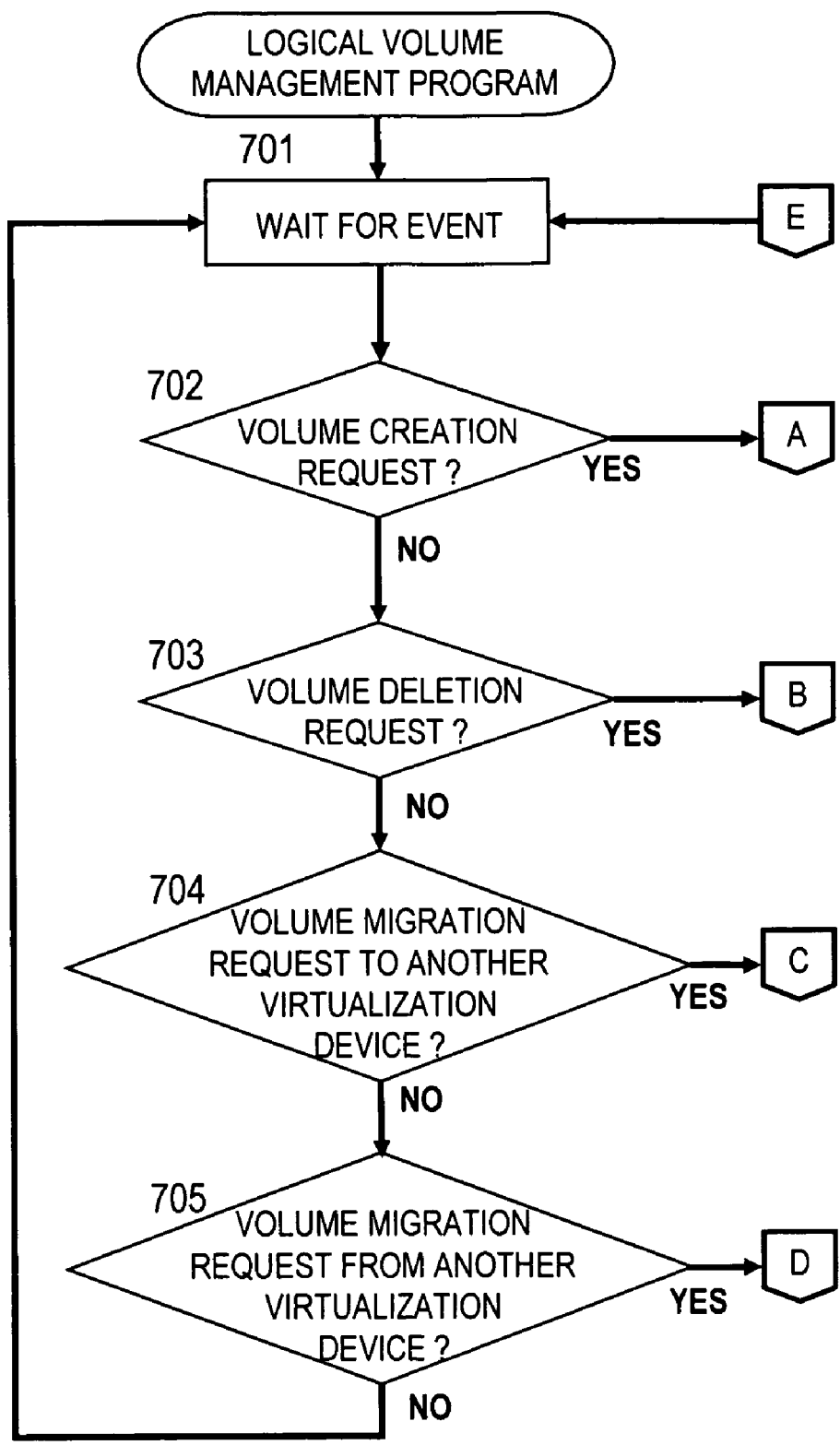
FIG. 7A is a flowchart showing the process of a logical volume management program of the first embodiment of this invention.

Upon starting execution, the logical volume management program 137 waits for an event (Step 701 of FIG. 7A).

When receiving any of the requests with an event occurring, the logical volume management program 137 determines whether or not the received request is the volume creation request that the management server 16 has issued (Step 702).

Figure 7B:
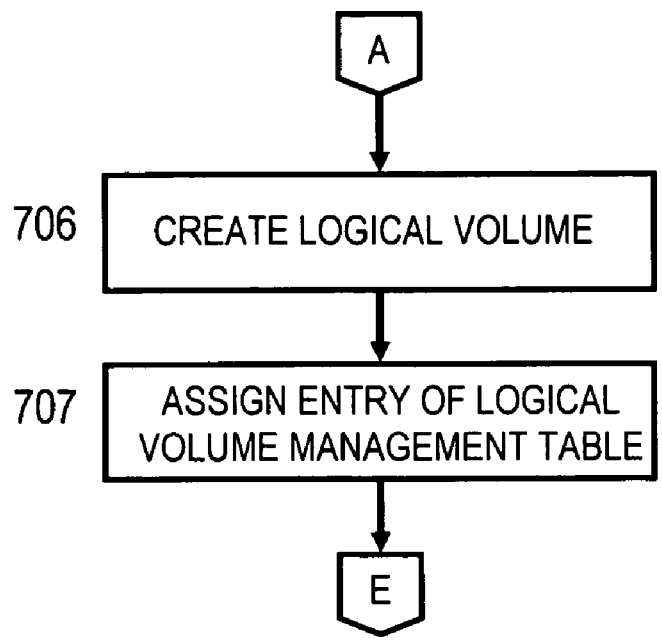
FIG. 7B is a flowchart showing the process of the logical volume management program of the first embodiment of this invention.

In Step 702, when it is determined that the received request is the volume creation request that the management server 16 has issued, the logical volume management program 137 creates the requested logical volume 131 (Step 706 of FIG. 7B). More specifically, the logical volume management program 137 secures the real volume 139 corresponding to the logical volume 131 that is the target of the creation request, on the storage system 133, and associates the real volume 139 with the logical volume 131. Incidentally, the area on the real volume 139 corresponding to the logical volume may be one or more of the entire real volumes 139, or may be a partial area of the real volume 139 or a group of the partial areas thereof.

Next, the logical volume management program 137 assigns an entry (a line) of the logical volume management table 138 to the created logical volume 131 (Step 707). At this time, the volume number newly given to the created logical volume 131 is registered for the volume number 301 within virtualization apparatus. At this moment, the unit serial number 302 of creation source virtualization apparatus and volume number 303 at creation time corresponding to the created logical volume 131 are both blank.

For example, the logical volume management program 137 of the virtualization apparatus 13A, when receiving the request to create VOL-A, secures the real volume 139 corresponding to VOL-A, and associates the real volume 139 with VOL-A (Step 706). Then, the logical volume management program 137 assigns an entry of the logical volume management table 138 to VOL-A (Step 707). At this time, the unit serial number 302 of creation source virtualization apparatus and volume number 303 at creation time corresponding to VOL-A are both blank (see FIG. 3A).

The logical volume management program 137 executes Step 707, and then returns to Step 701.

On the other hand, in Step 702, when it is determined that the received request is not the volume creation request that the management server 16 has issued, the logical volume management program 137 determines whether or not the received request is the volume deletion request that the management server 16 has issued (Step 703).

Figure 7C:
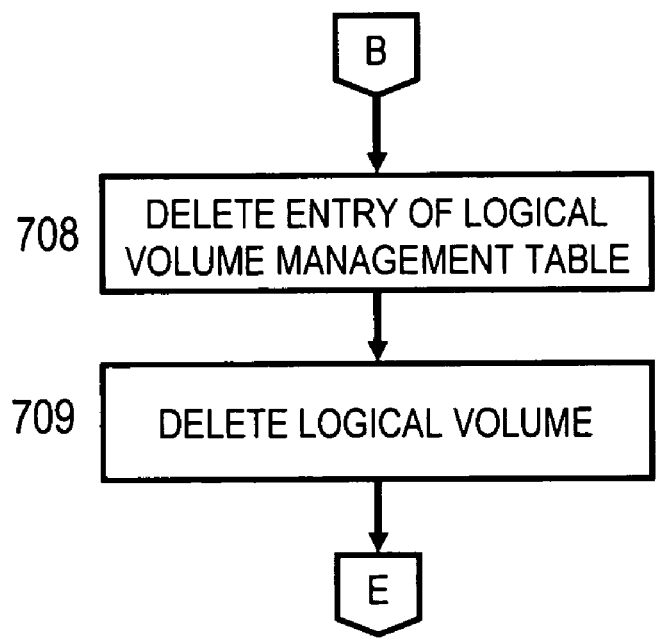
FIG. 7C is a flowchart showing the process of the logical volume management program of the first embodiment of this invention.

In Step 703, when it is determined that the received request is the volume deletion request that the management server 16 has issued, the logical volume management program 137 deletes the entry corresponding to the logical volume 131 that is the target of the deletion request, from the logical volume management table 138 (Step 708 of FIG. 7C).

Next, the logical volume management program 137 executes the deletion of the requested logical volume 131 (Step 709). More specifically, the logical volume management program 137 releases the correspondence between the requested logical volume 131 and the real volume 139.

The logical volume management program 137 executes Step 709, and then returns to Step 701.

On the other hand, in Step 703, when it is determined that the received request is not the volume deletion request the management server 16 has issued, the logical volume management program 137 determines whether or not the received request is the volume migration request that the management server 16 has issued (Step 704). The volume migration request that the management server 16 has issued is a request to migrate the logical volume 131 to the logical volume 131 of another virtualization apparatus 13.

Figure 7D:
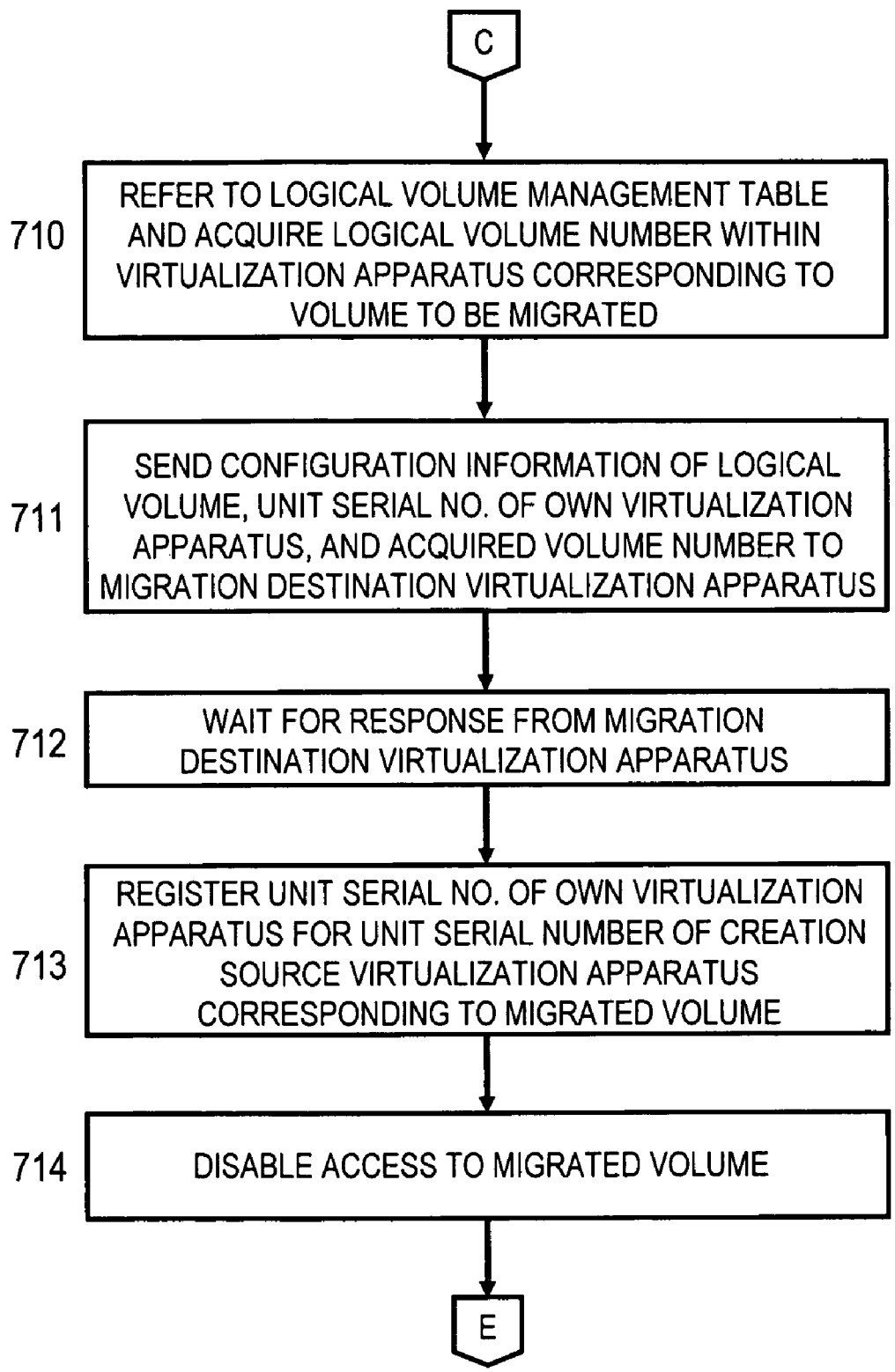
FIG. 7D is a flowchart showing the process of the logical volume management program of the first embodiment of this invention.

In Step 704, when it is determined that the received request is the volume migration request that the management server 16 has issued, the logical volume management program 137 refers to the logical volume management table 138, and acquires the volume number 301 within virtualization apparatus corresponding to the logical volume 131 to be migrated (Step 710 of FIG. 7D).

Next, the logical volume management program 137 sends the configuration information of the logical volume 131, the unit serial number of the own virtualization apparatus, and the volume number 301 within virtualization apparatus acquired in Step 710, to the migration destination virtualization apparatus 13 (Step 711). Herein, the configuration information of the logical volume 131 includes information indicating the correspondence between the logical volume 131 to be migrated and the real volume 139 in which the data written in the logical volume 131 is actually stored. Further, the unit serial number of the own virtualization apparatus is the unit serial number of the migration source virtualization apparatus 13 (i.e. the virtualization apparatus 13 to be the source of the information in Step 711). The logical volume management program 137 sends these pieces of information to the migration destination virtualization apparatus 13 as the volume migration request.

Next, the logical volume management program 137 waits for the response from the migration destination virtualization apparatus 13 (Step 712). This response is sent in Step 718 of FIG. 7E described below. The transmission of this response indicates the completion of the migration of the logical volume 131.

The logical volume management program 137 receives the response from the migration destination virtualization apparatus 13, and then registers the unit serial number of the own virtualization apparatus for the unit serial number 302 of creation source virtualization apparatus of the logical volume management table 138 corresponding to the migrated logical volume 131 (Step 713). The migrated logical volume 131 is the same as "the logical volume 131 to be migrated" in Step 710.

Next, the logical volume management program 137 prohibits the access to the migrated logical volume (Step 714).

The logical volume management program 137 executes Step 714, and then returns to Step 701.

Herein, as an example of the process of FIG. 7D, the description will be made about the case in which the logical volume management program 137 of the virtualization apparatus 13A receives the request to migrate VOL-B to the virtualization apparatus 13B, from the management server 16 (Step 704).

In this case, the logical volume management program 137 refers to the logical volume management table 138 and acquires "VOL-B" in Step 710 (see FIG. 3A).

Next, in Step 711, the logical volume management program 137 sends the configuration information of VOL-B, the unit serial number "U1" of the virtualization apparatus 13A, and "VOL-B" acquired in Step 710, to the virtualization apparatus 13B.

The logical volume management program 137 receives the response from the virtualization apparatus 13B in Step 712, and then registers the unit serial number "U1" of the virtualization apparatus 13A for the unit serial number 302 of creation source virtualization apparatus corresponding to "VOL-B" of the logical volume management table 138 in Step 713 (see FIG. 3A).

Next, the logical volume management program 137 prohibits the access to VOL-B (Step 714), and then returns to Step 701.

On the other hand, in Step 704, when it is determined that the received request is not the volume migration request that the management server 16 has issued, the logical volume management program 137 determines whether or not the received request is the volume migration request that another virtualization apparatus 13 has issued (Step 705). The volume migration request that another virtualization apparatus 13 has issued is a request to migrate the logical volume 131 of another virtualization apparatus 13 to the logical volume 131 of the own virtualization apparatus 13 (i.e. the virtualization apparatus 13 having received the request). This request is specifically the volume migration request having been sent in Step 711 of FIG. 7D.

In Step 705, when determining that the received request is the volume migration request that another virtualization apparatus 13 has issued, the logical volume management program 137 receives the configuration information of the logical volume 131, the unit serial number of the migration source virtualization apparatus 13, and the volume number 301 within virtualization apparatus (Step 715). These pieces of information are the ones sent in Step 711 of FIG. 7D.

Next, the logical volume management program 137 configures a new logical volume 131 (Step 716). More specifically, the logical volume management program 137 refers to the configuration information of the logical volume 131 received in Step 715, and associates the real volume 139 corresponding to the migration source logical volume 131 with the newly created logical volume 131.

Next, the logical volume management program 137 assigns one entry of the logical volume management table 138 to the newly configured logical volume 131 (Step 717). At this time, the volume number given to the newly configured logical volume is stored for the volume number 301 within virtualization apparatus of the entry. The unit serial number of the migration source virtualization apparatus 13 received in Step 715 is stored for the unit serial number 302 of creation source virtualization apparatus of the entry. Further, the volume number 301 within virtualization apparatus received in Step 715 is stored for the volume number 303 at creation time of the entry.

Next, the logical volume management program 137 sends the volume migration response back to the migration source virtualization apparatus 13 (Step 718). This response is to notify about the completion of the migration of the logical volume 131.

The logical volume management program 137 executes Step 718, and then returns to Step 701.

Figure 7E:
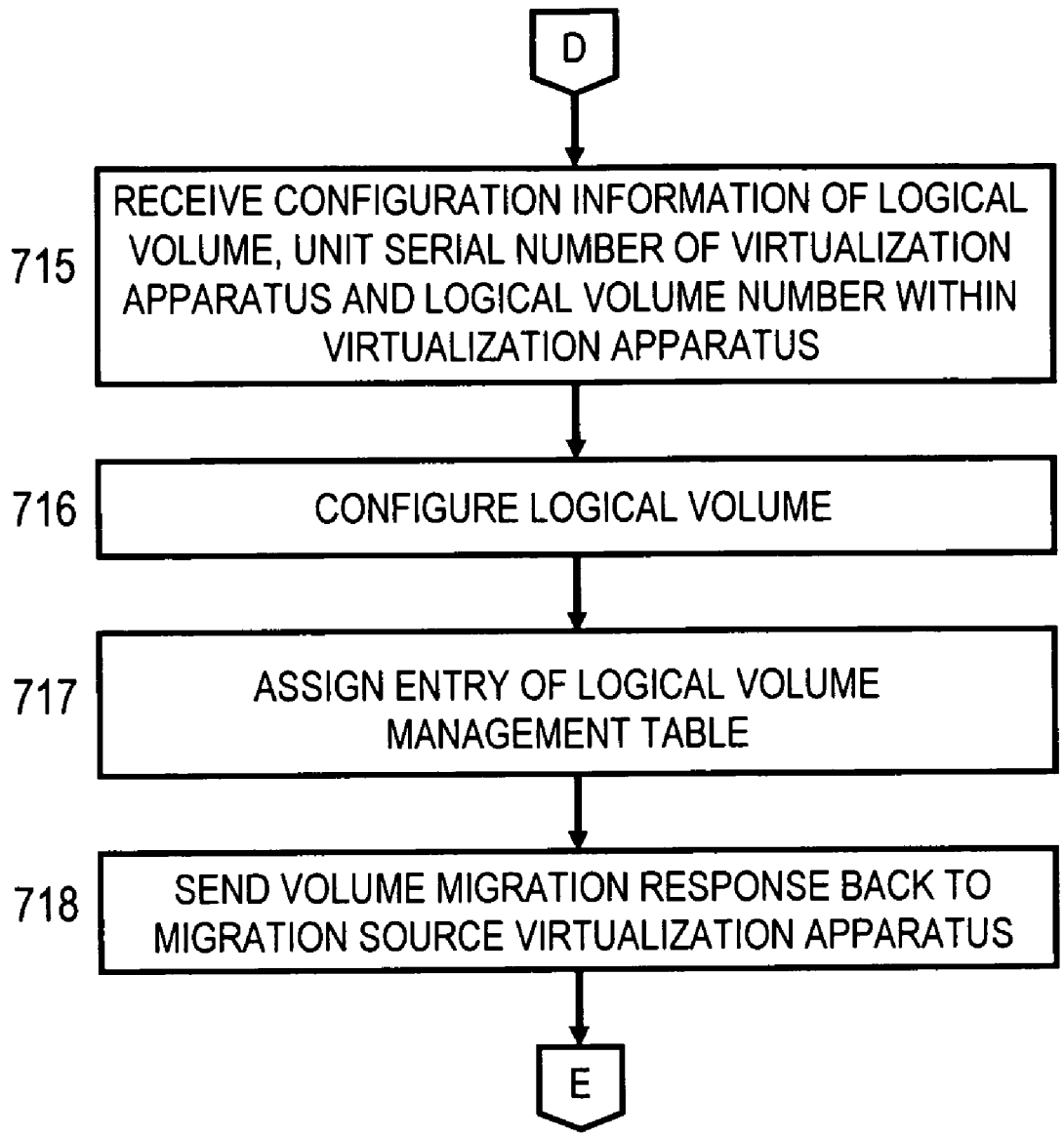
FIG. 7E is a flowchart showing the process of the logical volume management program of the first embodiment of this invention.

Herein, as an example of the process of FIG. 7E, the description will be made about the case in which the logical volume management program 137 of the virtualization apparatus 13B receives the request to migrate VOL-B of the virtualization apparatus 13A to the virtualization apparatus 13B, from the virtualization apparatus 13A (Step 705).

In this case, the logical volume management program 137 of the virtualization apparatus 13B receives the configuration information of VOL-B, the unit serial number "U1" of the migration source virtualization apparatus 13A, and the volume number within virtualization apparatus "VOL-B" in Step 715.

Next, in Step 716, the logical volume management program 137 configures VOL-C as a new logical volume. VOL-C is associated with the real volume 139 to which VOL-B has corresponded.

Next, in Step 717, the logical volume management program 137 assigns one entry of the logical volume management table 138 to VOL-C. "VOL-C" for the virtualization apparatus volume number 301, "U1" for the serial number 302 of creation source virtualization apparatus, and "VOL-B" for the volume number 303 at creation time, respectively are stored in the entry. (see FIG. 3B).

Next, the logical volume management program 137 sends the volume migration response back to the migration source virtualization apparatus 13A (Step 718), and then returns to Step 701.

Figure 8:
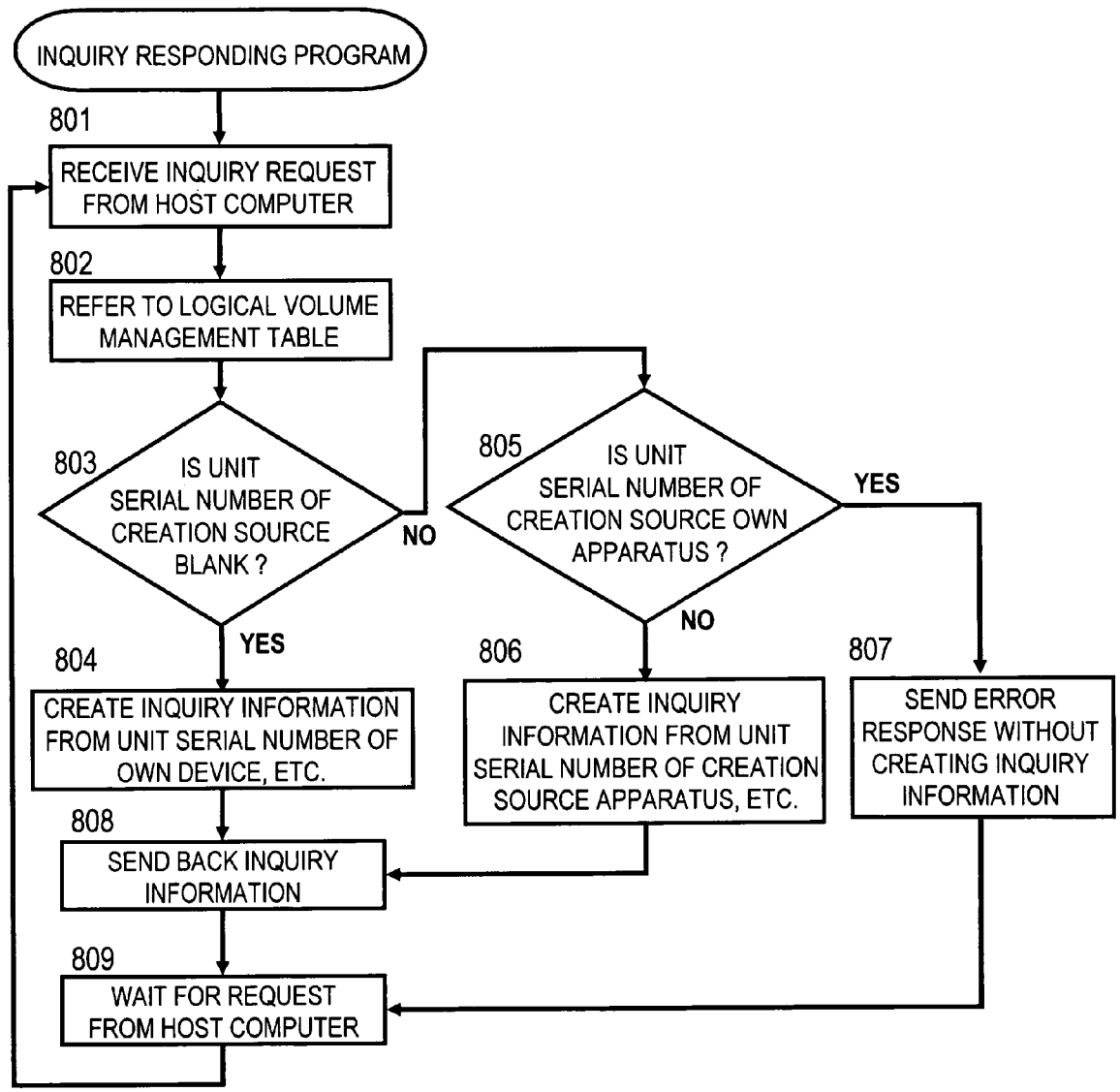
FIG. 8 is a flowchart showing the process of an inquiry responding program of the first embodiment of this invention.

FIG. 8 is a flowchart showing the process of the inquiry responding program 136 of the first embodiment of this invention.

The virtualization apparatus 13 receives the inquiry request relative to either of the logical volumes 131 from the host computer 12, and the process of the inquiry responding program 136 starts (Step 801).

Next, the inquiry responding program 136 refers to the logical volume management table 138 (Step 802). More specifically, the inquiry responding program 136 refers to the entry corresponding to the logical volume 131 that is the target of the inquiry request in the logical volume management table 138.

Next, the inquiry responding program 136 determines whether or not the unit serial number 302 of creation source virtualization apparatus of the entry referred to in Step 802 is blank (Step 803).

When it is determined that the unit serial number 302 of creation source virtualization apparatus is blank in Step 803, the logical volume 131 corresponding to the entry is not the migration destination from the logical volume 131 of another virtualization apparatus 13 or the migration source to the logical volume 131 of another virtualization apparatus 13. In this case, the inquiry responding program 136 creates the inquiry information 400 with the unit serial number of the own virtualization apparatus (i.e. the virtualization apparatus 13 including the inquiry responding program 136) as the apparatus identifier 401 and the volume number that the own virtualization apparatus given to the logical volume as the volume number 402 (Step 804).

On the other hand, in Step 803, when it is determined that that the unit serial number 302 of creation source virtualization apparatus is not blank, the logical volume 131 corresponding to the entry is the migration destination from the logical volume 131 of another virtualization apparatus 13 or the migration source to the logical volume 131 of another virtualization apparatus 13. In this case, the inquiry responding program 136 determines whether or not the unit serial number 302 of creation source virtualization apparatus of the entry referred to in Step 802 is the unit serial number of the own virtualization apparatus (Step 805).

When it is determined that the unit serial number 302 of creation source virtualization apparatus is not the unit serial number of the own virtualization apparatus in Step 805, the logical volume 131 corresponding to the entry is the migration destination from the logical volume 131 of another virtualization apparatus 13. In this case, the inquiry responding program 136 creates the inquiry information 400 using the information inherited from the migration source logical volume 131 (Step 806). More specifically, the inquiry responding program 136 creates the inquiry information 400 with the value registered for the unit serial number 302 of creation source virtualization apparatus of the entry as the apparatus identifier 401, and the value registered for the volume number 303 at creation time as the volume number 402 (Step 806).

On the other hand, in Step 805, when it is determined that the unit serial number 302 of creation source virtualization apparatus is the unit serial number of the own virtualization apparatus, the logical volume 131 corresponding to the entry is the migration source to the logical volume 131 of another virtualization apparatus 13. In other words, the logical volume 131 corresponding to the entry has already been migrated to another virtualization apparatus 13, and is not present in the own virtualization apparatus. In this case, the inquiry responding program 136 does not create the inquiry information 400, and sends an error response to the host computer 12 (Step 807).

The inquiry responding program 136 creates the inquiry information 400 in Step 804 or Step 806, and sends the created inquiry information 400 to the host computer 12 (Step 808).

As described above, the inquiry responding program 136 completes the response to the received inquiry request. The inquiry responding program 136 sends the inquiry information 400 in Step 808 or sends the error response in Step 807, and then waits to receive the next inquiry request from the host computer 12 (Step 809). When receiving the next inquiry request, the process of the inquiry responding program 136 returns to Step 801.

For example, when the virtualization apparatus 13A receives the inquiry request relative to VOL-A (Step 801), the inquiry responding program 136 of the virtualization apparatus 13A refers to the logical volume management table 138 (FIG. 3A) of the virtualization apparatus 13A (Step 802). The unit serial number 302 of creation source virtualization apparatus of the entry relating to VOL-A of the logical volume management table 138 is blank (Step 803). Thus, the inquiry responding program 136 creates the inquiry information 400 with the unit serial number "U1" of the virtualization apparatus 13A as the apparatus identifier 401 and the volume number "VOL-A" of VOL-A as the volume number 402, and sends the created inquiry information 400 to the host computer 12 (Steps 804, 808).

When the virtualization apparatus 13A receives the inquiry request relative to VOL-B before migrating the VOL-B to VOL-C (Step 801), the inquiry responding program 136 of the virtualization apparatus 13A refers to the logical volume management table 138 (FIG. 3A) of the virtualization apparatus 13A (Step 802). Before the migration of VOL-B to VOL-C, the unit serial number 302 of creation source virtualization apparatus of the entry relating to VOL-B of the logical volume management table 138 is blank (Step 803). "U1" is the unit serial number of the virtualization apparatus 13A (i.e. the own virtualization apparatus) (Step 805). Thus, the inquiry responding program 136 creates the inquiry information 400 with the unit serial number "U1" of the virtualization apparatus 13A as the apparatus identifier 401 and the volume number "VOL-B" of VOL-B as the volume number 402, and sends the created inquiry information to the host computer 12 (Steps 804, 808).

When the virtualization apparatus 13A receives the inquiry request relative to VOL-B after migrating VOL-B to VOL-C (Step 801), the inquiry responding program 136 of the virtualization apparatus 13A refers to the logical volume management table 138 (FIG. 3A) of the virtualization apparatus 13A (Step 802). The unit serial number 302 of creation source virtualization apparatus of the entry relating to VOL-B of the logical volume management table 138 is "U1", and not blank (Step 803). "U1" is the unit serial number of the virtualization apparatus 13A (i.e. the own virtualization apparatus) (Step 805). Thus, the inquiry responding program 136 does not create the inquiry information 400, and sends an error response to the host computer 12 (Step 807).

On the other hand, when the virtualization apparatus 13B receives the inquiry request relative to VOL-C (Step 801), the inquiry responding program 136 of the virtualization apparatus 13B refers to the logical volume management table 138 (FIG. 3B) of the virtualization apparatus 13B (Step 802). The unit serial number 302 of creation source virtualization apparatus of the entry relating to VOL-C of the logical volume management table 138 is "U1" and not blank (Step 803). "U1" is not the unit serial number of the virtualization apparatus 13B (i.e. the own virtualization apparatus) (Step 805). Thus, the inquiry responding program 136 creates the inquiry information 400 with the value "U1" registered for the unit serial number 302 of creation source virtualization apparatus as the apparatus identifier 401 and the value "VOL-B" registered for the volume number 303 at creation time as the volume number 402, and sends the created inquiry information to the host computer 12 (Steps 806, 808). These values are the same as those of the inquiry information 400 created when the inquiry request relative to VOL-B is issued before migrating the VOL-B to VOL-C.

Conventionally, in the case of receiving the inquiry request relative to VOL-C, the virtualization apparatus 13B has sent the unit serial number "U2" of the virtualization apparatus 13B and the logical volume name "VOL-C" of VOL-C as the inquiry information 400. However, as described above, the virtualization apparatus 13B of the embodiment sends the unit serial number "U1" and logical volume name "VOL-B" that are inherited from the migration source as the inquiry information 400.

Figure 9:
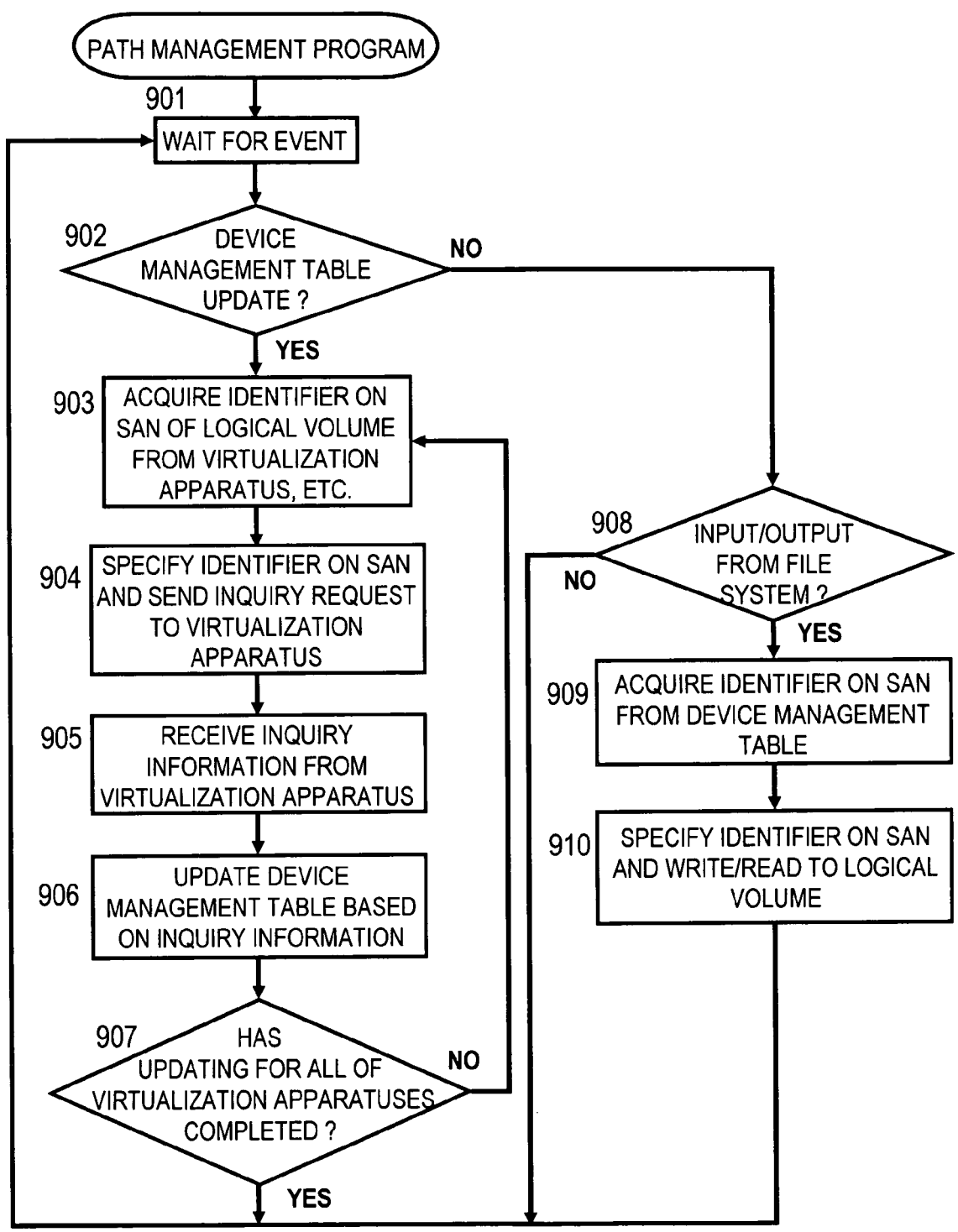
FIG. 9 is a flowchart showing the process of a path management program of the first embodiment of this invention.

FIG. 9 is a flowchart showing the process of the path management program 125 of the first embodiment of this invention.

Upon starting execution, the path management program 125 waits for an event (Step 901).

When any event occurs, the path management program 125 determines whether or not the occurring event is the device management table update event (Step 902). The device management table update event is an event that triggers the update of the device management table 127.

More specifically, there may be a case in which a timer (not shown) notifies the path management program 125 that a predetermined period of time has passed, and the path management program 125 detects the notification as the device management table update event. The path management program 125 may detect an interruption that occurs in the SAN interface 172 when the state on the SAN 17 changes, such as when the logical volume 131 is created, deleted or migrated, as the device management table update event. There may also be a case in which, when an error is returned to the access request relative to either of the logical volumes 131 (i.e. the access to the logical volume 131 is failed), the path management program 125 detects the error as the device management table update event.

In Step 902, when it is determined that the occurring event is the device management table update event, that is when the timing of periodically updating the device management table 127 comes, or when the state on the SAN 17 is changed (more specifically, the logical volume 131 is created, deleted or migrated, etc.). In this case, the path management program 125 acquires the identifier on SAN of the logical volume 131 from the virtualization apparatus 13 or a name management server (not shown) (Step 903). The name management server is a server that manages the identifiers on SAN of the apparatuses present on the SAN 17, and that provides a list of the identifiers on SAN according to the request. The computer system of the embodiment may include such a name management server.

Next, the path management program 125 specifies the acquired identifier on SAN and issues (sends) the inquiry request to the virtualization apparatus 13 (Step 904). FIG. 8 shows the process that the inquiry responding program of the virtualization apparatus 13 having received this inquiry request executes.

Next, the path management program 125 receives the inquiry information 400 from the virtualization apparatus 13 (Step 905).

Next, the path management program 125 refers to the inquiry information 400 received from the virtualization apparatus 13, and updates the device management table 127 (Step 906). More specifically, the path management program 125 registers the apparatus identifier 401 and volume number 402 of the received inquiry information 400 for the apparatus identifier 501 and volume number 502 of the entry corresponding to the specified identifier on SAN 504, respectively.

Next, the path management program 125 determines whether or not it has completed the update of the device management table 127 for all of the logical volumes of the virtualization apparatuses 13 (Step 907).

When it is determined that it has completed the update of the device management table 127 for all of the logical volumes 131 of the virtualization apparatuses 13 in Step 907, the process returns to Step 901 and waits for the next event.

In Step 907, when it is determined that it has not completed the update of the device management table 127 for all of the logical volumes 131 of the virtualization apparatuses 13, the process returns to Step 903 in order to update the device management table 127 for the next logical volume 131.

On the other hand, in Step 902, when it is determined that the occurring event is not the device management table update event, the path management program 125 determines whether or not the occurring event is the input/output request from the FS 124 (Step 908).

When it is determined that the occurring event is the input/output request from the FS 124 in Step 908, the path management program 125 refers to the device management table 127 and acquires the identifier on SAN 504(Step 909).

Next, the path management program 125 specifies the acquired identifier on SAN 504, and executes the writing or reading of the requested data to the logical volume 131 (Step 910).

The path management program 125 executes Step 910, and then returns to Step 901 to wait for the next event.

On the other hand, in Step 908, when it is determined that the occurring event is not the input/output request from the FS 124, the path management program 125 returns to Step 901 and waits for the next event.

Herein, as an example, the description will be made about the process the path management program 125 executes after VOL-B has migrated to VOL-C.

When VOL-B has migrated to VOL-C, the host computer 12 attempts to access VOL-B and fails, thereby the path management program 125 detects the device management table update event (Step 902).

In this case, the path management program 125 acquires the identifier on SAN (Step 903), and sends the inquiry request relative to VOL-C of the virtualization apparatus 13B (Step 904).

Next, the path management program 125 receives the inquiry information 400 (Step 905). Conventionally, the inquiry responding program 136 has created the inquiry information 400 composed of "U2" and "VOL-C" for the inquiry request relative to VOL-C of the virtualization apparatus 13B. However, in the embodiment, when VOL-B has migrated to VOL-C, the inquiry responding program 136 creates the inquiry information 400 composed of "U1" and "VOL-B" for the inquiry request relative to VOL-C of the virtualization apparatus 13B. This is identical to the inquiry information 400 created when the inquiry request relative to the migration source VOL-B is issued before VOL-B migrates to VOL-C (see FIG. 8).

Next, the path management program 125 updates the device management table 127 based on the received inquiry information 400 (Step 906). Herein, the virtual device name 503 "/dev/dsk/vol0002" is given to VOL-B before migration. "U1" and "VOL-B" that the path management program 125 received as the inquiry information 400 in Step 906 are the same as those of the inquiry information 400 relating to the migration sources VOL-B. Thereby, the path management program 125 recognizes that VOL-C is the same logical volume 131 as VOL-B, and continuously gives the virtual device name 503 "dev/dsk/vol0002" to "U1" and "VOL-B". The path management program 125 updates the identifier on SAN 504 corresponding to these, to the value corresponding to the actual VOL-C.

Figure 10:
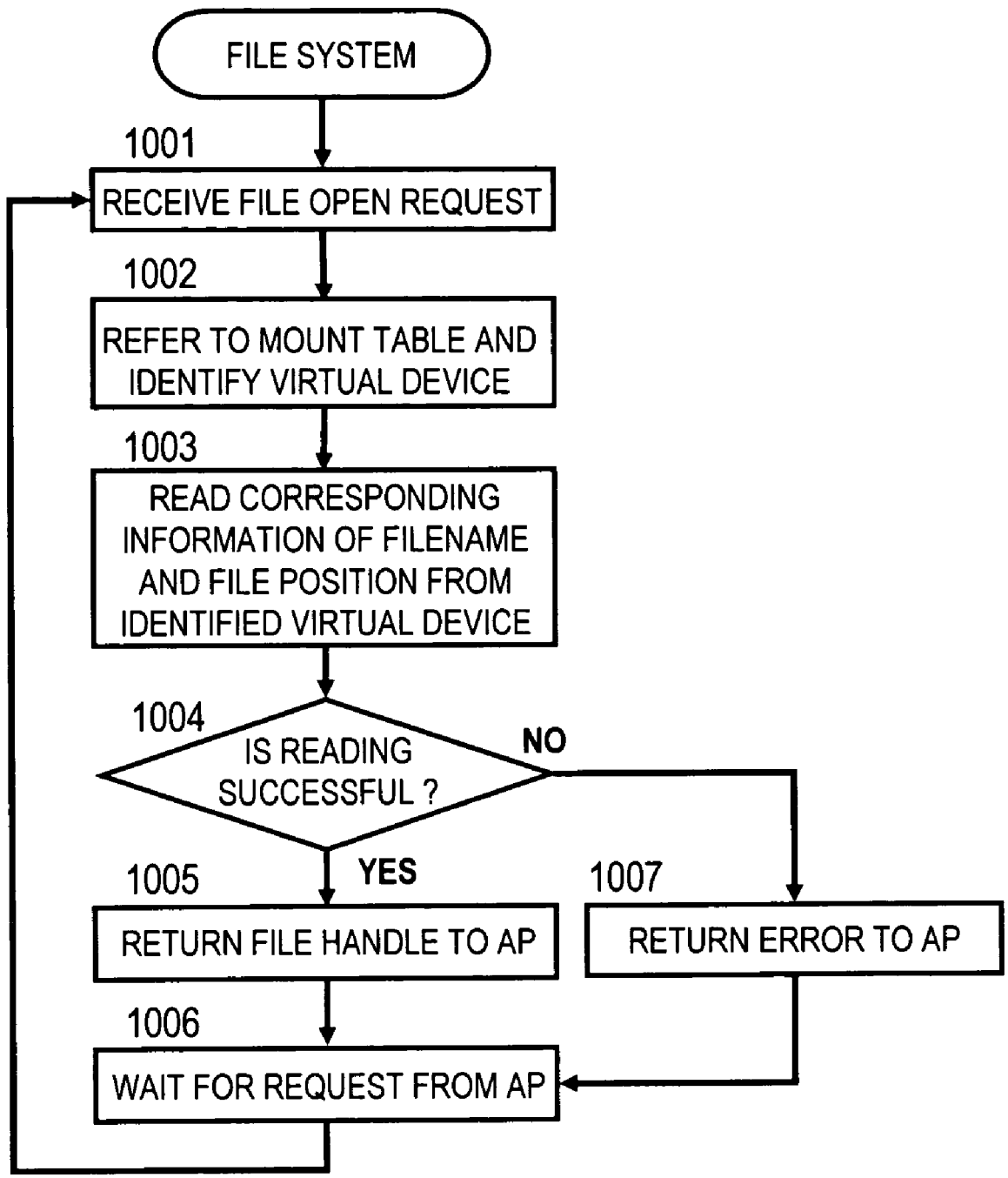
FIG. 10 is a flowchart showing the process of a file system of the first embodiment of this invention.

FIG. 10 is a flowchart showing the process of the file system (FS) 124 of the first embodiment of this invention.

The FS 124 first receives the file open request with the filename specified from the AP 123 (Step 1001).

Next, the FS 124 refers to the mount table 126, and identifies which virtual device stores the requested file (Step 1002). More specifically, the FS 124 searches the first character string identical to that of the specified filename from the filename first character string 602. For example, when the filename specified in Step 1001 is "/home2/testuser/file1.txt", the FS 124 identifies the virtual device having the filename first character string 602 of "/home2" (i.e. the device having the virtual device name 601 of "dev/dsk/vol0002").

Next, the FS 124 reads the information about correspondence between the filename and the file position from the identified virtual device (Step 1003). This information is included in the data on the identified virtual device.

Next, the FS 124 determines whether or not the reading of Step 1003 is successful (Step 1004).

When it is determined that the reading is successful in Step 1004, the FS 124 returns a file handle (not shown) to the AP 123 (Step 1005). The file handle is the management number of the file. The AP 123 can subsequently execute the reading and writing to the file using this file handle.

In Step 1004, when it is determined that the reading is failed, the FS 124 returns an error to the AP 123 (Step 1007).

The FS 124 executes Step 1005 or Step 1007, and then waits for the next request from the AP 123 (Step 1006). When the FS 124 receives the next request from the AP 123, the process returns to Step 1001.

Figure 11:
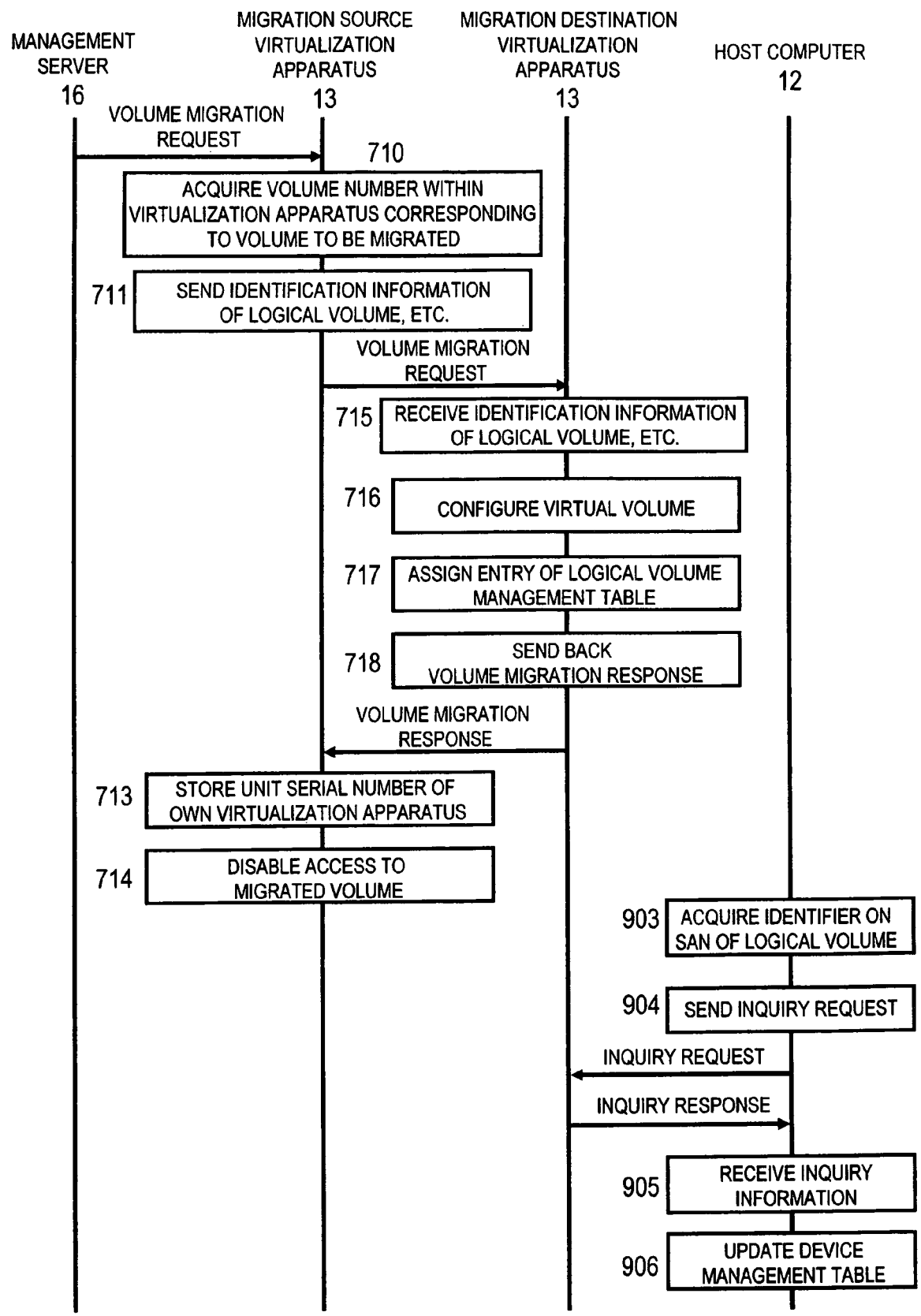
FIG. 11 is a sequence diagram showing the procedure of a migration of a logical volume in the first embodiment of this invention.

FIG. 11 is a sequence diagram showing the procedure of the migration of the logical volume 131 in the first embodiment of this invention.

FIG. 11 shows the correlation between the processes that the logical volume management program 137 of the migration source virtualization apparatus 13 (hereinafter referred to as the migration source logical volume management program 137), the logical volume management program 137 of the migration destination virtualization apparatus 13 (hereinafter referred to as the migration destination logical volume management program 137), and the path management program 125 of the host computer 12 execute when the logical volume 131 is migrated. The steps shown in FIG. 11 correspond to the steps shown in FIGS. 7D, 7E, and 9, respectively. Thus, the detailed description about the individual steps will be omitted. Further, FIG. 11 is for explaining the correlation between the processes that the individual programs execute, so that the illustration about the steps unnecessary for the explanation will be omitted.

First of all, the migration source logical volume management program 137 receives the volume migration request from the management server 16, and acquires the volume number 301 within virtualization apparatus corresponding to the logical volume 131 to be migrated (Step 710).

Next, the migration source logical volume management program 137 sends the configuration information of the logical volume 131, the unit serial number of own virtualization apparatus, and the volume number 301 within virtualization apparatus acquired in Step 710, to the migration destination logical volume management program 137 (Step 711). The unit serial number of own virtualization apparatus and the volume number 301 within virtualization apparatus are the identification information of the logical volume 131 to be migrated.

The migration destination logical volume management program 137 receives the identification information or the like of the logical volume 131 (Step 715), and refers to the received information to configure a new logical volume 131 (Step 716).

Next, the migration destination logical volume management program 137 assigns one entry of the logical volume management table 138 to the newly configured logical volume 131 (Step 717).

Next, the migration destination logical volume management program 137 sends the volume migration response to the migration source logical volume management program 137 (Step 718).

The migration source logical volume management program 137 receives the response, and registers the unit serial number of own virtualization apparatus for the unit serial number 302 of creation source virtualization apparatus of the logical volume management table 138 (Step 713).

Next, the migration source logical volume management program 137 prohibits the access to the migrated logical volume 131 (Step 714).

The path management program 125 of the host computer 12 detects, for example, that the access to the migration source logical volume 131 is not available, and then acquires the identifier on SAN of the logical volume 131 (Step 903).

Next, the path management program 125 specifies the acquired identifier on SAN, and sends the inquiry request to the virtualization apparatus 13 (Step 904).

The path management program 125 receives the inquiry information 400 from the virtualization apparatus 13 (Step 905), and refers to the received inquiry information 400 to update the device management table 127 (Step 906).

With the embodiment, the inquiry information 400 of the migration source logical volume 131 and the inquiry information 400 of the migration destination logical volume 131 are identical to each other. Thereby, the path management program 125 does not update the contents other than the identifier on SAN 504 in the device management table 127. As a result, although the system administrator does not update the correspondence between the filename and the virtual device name, the AP 123 of the host computer 12 can access the file of the migration destination logical volume 131.

Next, a second embodiment of this invention will be described.

The configuration of the computer system of the second embodiment of this invention is the same as that of the first embodiment, so that the description thereof will be omitted (see FIG. 1).

Figure 12:
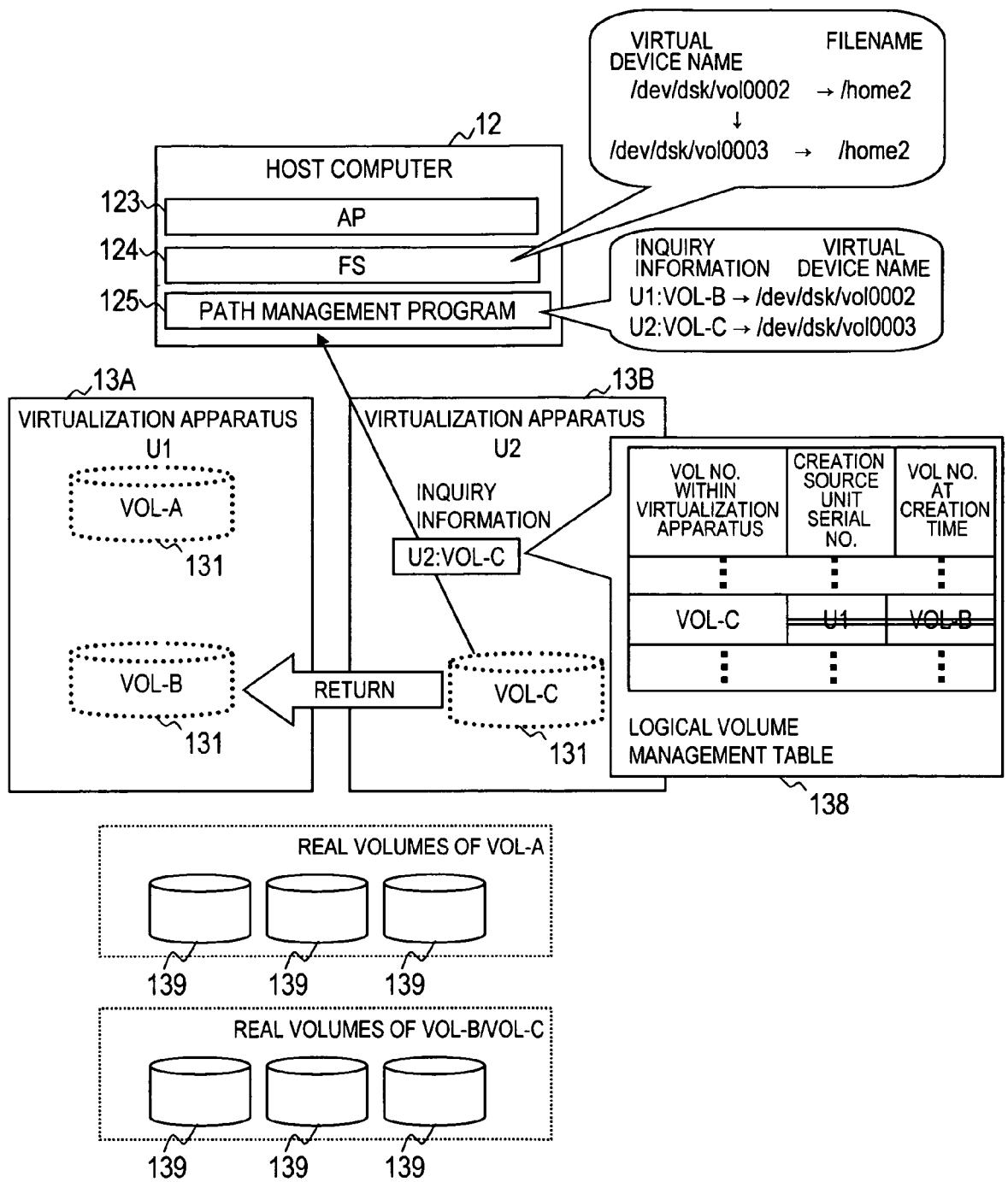
FIG. 12 is an explanatory diagram showing the outline of a second embodiment of this invention.

FIG. 12 is an explanatory diagram showing the outline of the second embodiment of this invention.

In FIG. 12, the description about the same parts as those in FIG. 2 will be omitted.

In the first embodiment of this invention, when VOL-B migrates to VOL-C, VOL-C inherits the unit serial number 302 "U1" of creation source virtualization apparatus and the volume number at creation time "VOL-B" from VOL-B. In this case, the inquiry information 400 needs to be unique within the computer system, so that the virtualization apparatus 13A cannot give the volume number "VOL-B" to the newly created logical volume 131.

Further, in the first embodiment, after VOL-B has migrated to VOL-C, the host computer 12 continues to recognize VOL-C as VOL-B on the virtualization apparatus 13A. Thereby, even though the virtualization apparatus 13B would have a function that the virtualization apparatus 13A does not have, it cannot apply the function to VOL-C.

In the second embodiment of this invention, the migration destination virtualization apparatus 13 returns the inherited information to the migration source virtualization apparatus 13 at an appropriate time after the migration of the logical volume 131. The appropriated time is, for example, when a planned shutdown of the computer system takes place. At this time, the system administrator changes the setting of the host computer 12.

For example, in FIG. 12, when VOL-B migrates to VOL-C, VOL-C inherits "U1" and "VOL-B" from VOL-B. Subsequently, when the planned shutdown of the computer system takes place, the virtualization apparatus 13B returns "U1" and "VOL-B" to the virtualization apparatus 13A. More specifically, the virtualization apparatus 13B deletes "U1" and "VOL-B" that correspond to VOL-C from the logical volume management table 138.

Then, the host computer 12 issues the inquiry request to VOL-C, and the virtualization apparatus 13B sends the inquiry information composed of the unit serial number "U2" of the virtualization apparatus 13B and the logical volume name "VOL-C" of VOL-C. Thereby, although VOL-B and VOL-C correspond to the same real volume 139, the path management program 125 of the host computer 12 recognizes VOL-C as the different logical volume 131 from VOL-B. When the virtual device name "/dev/dsk/vol0002" is assigned to VOL-B, the path management program 125 assigns, to VOL-C, a virtual device name that is different from the above name (e.g. "/dev/dsk/vol0003").

At this time, the system administrator releases the correspondence between the virtual device name of VOL-B "/dev/dsk/vol0002" and the filename (in the example of FIG. 12, "/home2"), and updates the mount table 126 so as to newly establish the correspondence between the virtual device name of VOL-C "/dev/dsk/vol0003" and filename "/home2".

As a result, the AP 123 of the host computer 12 can continuously access the file stored in VOL-C. The virtualization apparatus 13A can give the volume number "VOL-B" to the newly created logical volume 131. In addition, the virtualization apparatus 13B can apply its function to VOL-C.

Hereinafter, the embodiment will be described in detail.

The logical volume management table 138, inquiry information, device management table 127 and mount table 126 of the embodiment are the same as those of the first embodiment of this invention, so that the description thereof will be omitted (see FIGS. 3A to 6). Further, the processes that the inquiry responding program 136, path management program 125 and FS 124 of the embodiment execute are the same as those of the first embodiment of this invention, so that the description thereof will be omitted (see FIGS. 8 to 10).

Figure 13A:
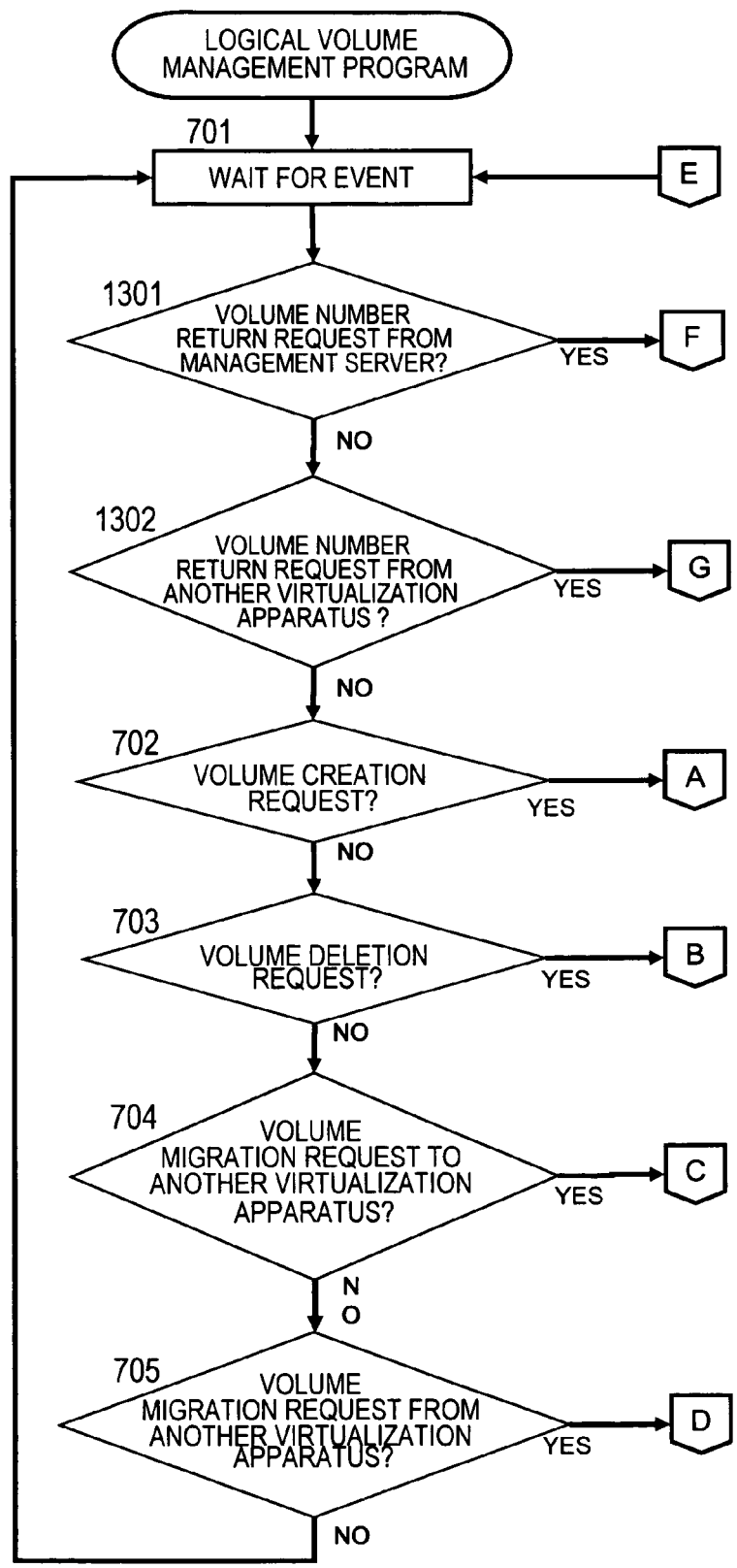
FIG. 13A is a flowchart showing the process of a logical volume management program of the second embodiment of this invention.
Figure 13:
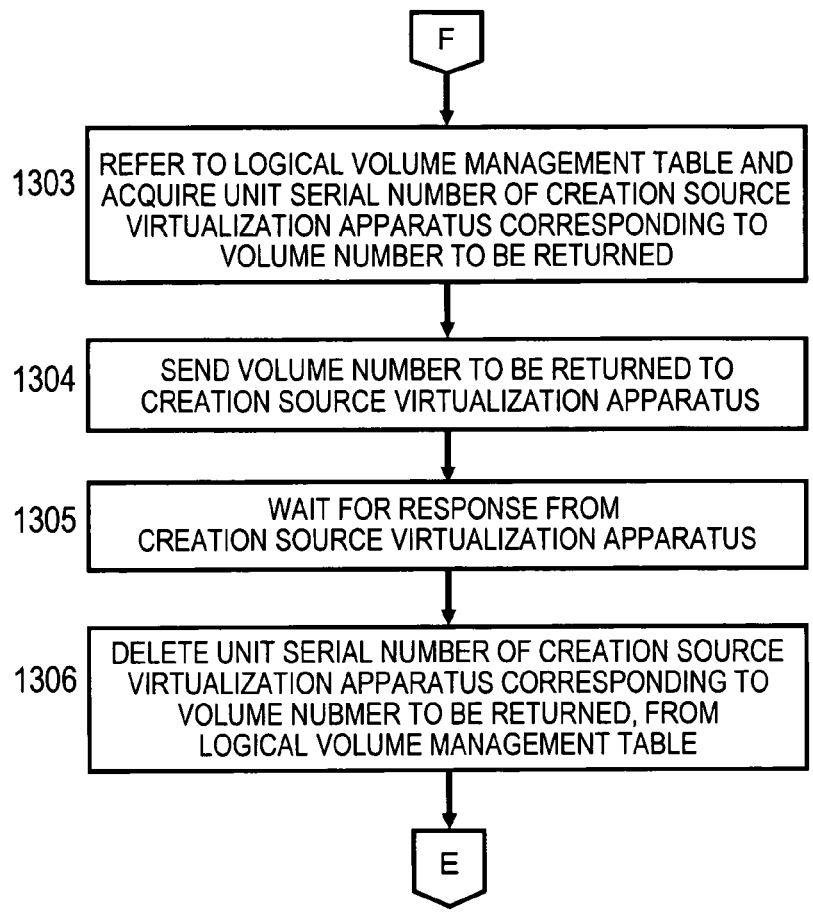
FIG. 13B is a flowchart showing the process of the logical volume management program of the second embodiment of this invention.
FIG. 13C is a flowchart showing the process of the logical volume management program of the second embodiment of this invention.
Figure 13:
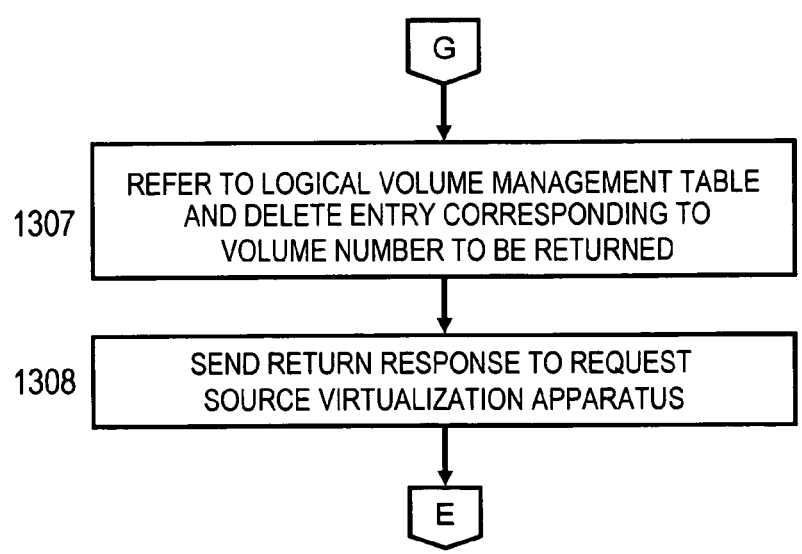

FIGS. 13A to 13C are flowcharts showing the processes of the logical volume management program 137 of the second embodiment of this invention.

The logical volume management program 137 of the embodiment receives the volume number return request, volume creation request, volume deletion request or volume migration request from the management server 16, and executes the processes in response to the requests. Further, the logical volume management program 137 of the embodiment receives the volume number return request and the volume migration request from another virtualization apparatus 13, and executes the processes in response to the requests. Hereinafter, these processes will be described.

Incidentally, in FIGS. 13A to 13C, the same step numbers are assigned to the same procedures as those in the logical volume management program 137 of the first embodiment of this invention.

Upon starting execution, the logical volume management program 137 waits for an event (Step 701 of FIG. 13A).

The logical volume management program 137 receives any of the requests with an event occurring, and determines whether or not the received request is the volume number return request the management server 16 has issued (Step 1301).

In Step 1301, when it is determined that the received request is the volume number return request that the management server 16 has issued, the logical volume management program 137 refers to the logical volume management table 138, and acquires the unit serial number 302 of creation source virtualization apparatus corresponding to the volume number to be returned (Step 1303 of FIG. 13B). The volume number to be returned is a volume number specified by the volume number return request.

Next, the logical volume management program 137 sends the volume number to be returned to the creation source virtualization apparatus 13 (Step 1304).

Next, the logical volume management program 137 waits for a response from the creation source virtualization apparatus 13 (Step 1305). This response is to be sent in Step 1308 of FIG. 13C that will be described below.

The logical volume management program 137 receives the response from the creation source virtualization apparatus 13, and deletes, from the logical volume management table 138, the unit serial number 302 of creation source virtualization apparatus corresponding to the volume number to be returned (Step 1306).

The logical volume management program 137 executes Step 1306, and then returns to Step 701 of FIG. 13A.

On the other hand, in Step 1301, when it is determined that the received request is not the volume number return request that the management server 16 has issued, the logical volume management program 137 determines whether or not the received request is the volume number return request that another virtualization apparatus 13 has issued (Step 1302).

In Step 1302, when the received request is the volume number return request that another virtualization apparatus 13 has issued, the logical volume management program 137 refers to the logical volume management table 138, and deletes the entry corresponding to the volume number to be returned (Step 1307 of FIG. 13C).

Next, the logical volume management program 137 sends the response indicating the completion of the volume number return, to the virtualization apparatus 13 having issued the volume number return request (Step 1308).

The logical volume management program 137 executes Step 1308, and then returns to Step 701 of FIG. 13A.

On the other hand, in Step 1302, when it is determined that the received request is not the volume number return request that another virtualization apparatus has issued, the logical volume management program 137 proceeds to Step 702.

Hereinafter, the processes from Steps 702 to 718 are the same as those of the first embodiment of this invention, so that the description thereof will be omitted (see FIGS. 7A to 7E).

Incidentally, in the case in which the logical volume management program 137 of the embodiment executes the processes shown in FIGS. 7B to 7E and completes them, the processes return to Step 701 of FIG. 13A.

Herein, a specific example of the processes of FIGS. 13B and 13C will be described. In the example, VOL-B of the virtualization apparatus 13A has migrated to VOL-C of the virtualization apparatus 13B. Further, VOL-C is inheriting "U1" and "VOL-B" from VOL-B (see FIG. 12).

First of all, the logical volume management program 137 of the virtualization apparatus 13B receives the volume number return request with the volume number "VOL-B" specified as the return target, from the management server 16 (Step 1301).

Next, the logical volume management program 137 of the virtualization apparatus 13B refers to the logical volume management table 138 (see FIG. 3B). In the logical volume management table 138, the value of the unit serial number 302 of creation source virtualization apparatus corresponding to the value "VOL-B" of the volume number 303 at creation time is "U1". Thereby, the logical volume management program 137 acquires "U1" as the value of the unit serial number 302 of creation source virtualization apparatus corresponding to the volume number to be returned "VOL-B" (Step 1303).

Next, the logical volume management program 137 of the virtualization apparatus 13B sends the volume number to be returned "VOL-B" to the creation source virtualization apparatus 13A, and waits for the response (Steps 1304 and 1305).

Upon receiving this volume number to be returned "VOL-B", the logical volume management program 137 of the virtualization apparatus 13A deletes the entry with the virtualization apparatus volume number 301 "VOL-B" from the logical volume management table 138 (see FIG. 3A) (Step 1307).

Next, the logical volume management program 137 of the virtualization apparatus 13A sends the response to the virtualization apparatus 13B (Step 1308).

The logical volume management program 137 of the virtualization apparatus 13B receives the response from the virtualization apparatus 13A, and deletes the value "U1" of the unit serial number 302 of creation source virtualization apparatus corresponding to the volume number to be returned "VOL-B", from the logical volume management table 138.

Subsequently, when the virtualization apparatus 13B receives the inquiry request relative to VOL-C, since the unit serial number 302 of creation source virtualization apparatus corresponding to VOL-C is blank, the inquiry responding program 136 creates the inquiry information composed of the unit serial number "U2" of the virtualization apparatus 13B and the logical volume name "VOL-C" of VOL-C (see Steps 803 and 804 of FIG. 8).

On the other hand, the logical volume management table 138 of the virtualization apparatus 13A has no entry in which the virtualization apparatus volume number 301 is "VOL-B". Thereby, the virtualization apparatus 13A can give the volume number "VOL-B" to the newly created logical volume 131.

Next, a third embodiment of this invention will be described.

The configuration of the computer system in the third embodiment of this invention is the same as that of the first embodiment, so that the description thereof will be omitted (see FIG. 1).

Figure 14:
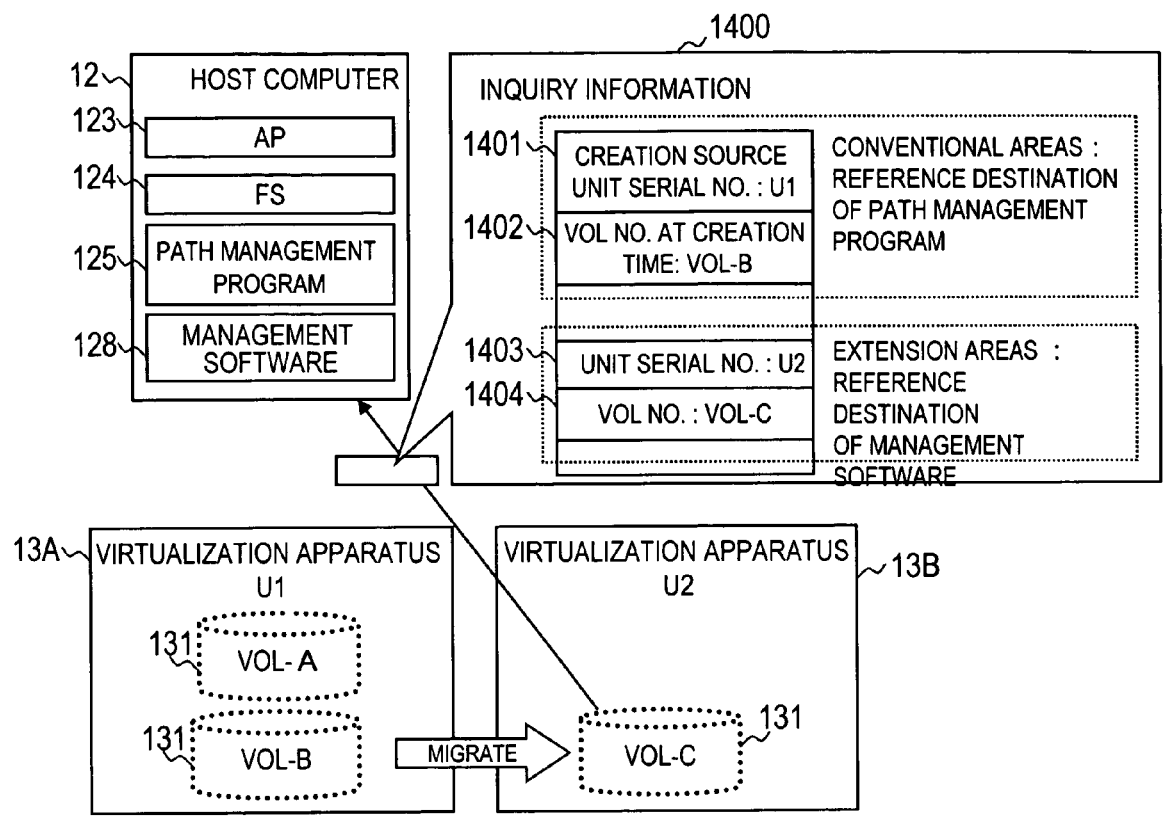
FIG. 14 is an explanatory diagram showing the outline of a third embodiment of this invention.

FIG. 14 is an explanatory diagram showing the outline of the third embodiment of this invention.

In FIG. 14, the description of the same parts as those in FIG. 2 will be omitted.

In the first embodiment of this invention, when the logical volume 131 inherits the unit serial number of the virtualization apparatus 13 and the volume number from another logical volume 131, the inquiry responding program 136 creates the inquiry information 400 using the inherited information. When the logical volume 131 does not inherit the unit serial number of the virtualization apparatus 13 and other related information from another logical volume 131, the inquiry responding program 136 creates the inquiry information 400 using the unit serial number of the own virtualization apparatus and the volume number of the logical volume 131.

The path management program 125 refers to the inquiry information 400 that the inquiry responding program 136 created, and assigns the virtual device name 503 to the logical volume 131.

However, there may be the case in which the host computer 12 has management software 128 other than the path management program 125 and the management software 128 refers to the inquiry information 400.

The management software 128 is a program that the memory 122 of the host computer 12 stores and the CPU 121 executes. The management software 128 of the embodiment is the program for changing the setting of the virtualization apparatuses 13. However, the management software 128 may include another function of managing the virtualization apparatuses 13.

It should be noted that the path management program 125 is also the program that manages the virtualization apparatuses, so that it can be categorized as one kind of management software. The management software 128 of the embodiment is the management software other than the path management program 125.

The management software 128 executes the setting change of the virtualization apparatus 13, so that the relevant virtualization apparatus may need to have a specific function. The specific function, for example, is a function that dynamically changes the capacity of the logical volume 131 the virtualization apparatus 13 manages. In such a case, the management software 128 refers to the model information included in the unit serial number within the inquiry information 400, and determines whether or not the virtualization apparatus 13 with the setting to be changed includes the required function. When it is determined that the virtualization apparatus 13 does not include the required function, the management software 128 does not execute the setting change.

For example, in FIG. 2, there may be the case in which the virtualization apparatus 13A is an old model not including the required function, and the virtualization apparatus 13B is a new model including the required function. When the first embodiment of this invention is applied to such a case, the inquiry information 400 created with respect to the logical volume 131 of the virtualization apparatus 13B includes the unit serial number "U1" of the virtualization apparatus 13A. Then, the management software 128 refers to the unit serial number "U1", and determines that the virtualization apparatus 13B is the old model. As a result, the management software 128 cannot execute the setting change in the virtualization apparatus 13B.

Similarly, when the second embodiment of this invention is applied to the above case, the management software 128 cannot execute the setting change in the virtualization apparatus 13B until the "U1" is returned from VOL-C to the virtualization apparatus 13A (see FIG. 12 and the other related figures).

In the case in which the logical volume 131 is inheriting the unit serial number from the other logical volume 131, inquiry information 1400 of the third embodiment of this invention includes the inherited unit serial number. Further, the inquiry information 1400 of the embodiment includes the unit serial number of the virtualization apparatus 13 having received the inquiry request. Hereinafter, the inquiry information 1400 of the embodiment will be described with reference to FIG. 14.

FIG. 14 shows the inquiry information 1400 that the inquiry responding program 136 of the virtualization apparatus 13B of the embodiment creates and sends, when the host has issued the inquiry request relative to VOL-C of the virtualization apparatus 13B. In this example, VOL-C is the migration destination of VOL-B of the virtualization apparatus 13A. VOL-C is inheriting the unit serial number "U1" of the virtualization apparatus 13A and the volume number "VOL-B" of VOL-B.

The inquiry information 1400 of the embodiment includes at least four areas of areas 1401 to 1404.

The area 1401 is the same as the area in which the unit serial number of the virtualization apparatus 13 is registered in the conventional inquiry information. The area 1401 is also the same as the area in which the unit serial number of the virtualization apparatus 13 (i.e. the apparatus identifier 401) is registered in the first and second embodiments of this invention.

The area 1402 is the same as the area in which the volume number of the logical volume 131 is registered in the conventional inquiry information. The area 1402 is also the same as the area in which the volume number of the logical volume 131 (i.e. the volume number 402) is registered in the first and second embodiments of this invention.

Registered in the areas 1401 and 1402 of the embodiment is the same information as that of the first and second embodiments. In other words, when the logical volume 131 is inheriting the unit serial number of the virtualization apparatus 13 and other related information from the migration source, the unit serial number 302 of creation source virtualization apparatus and the volume number 303 at creation time are registered in the areas 1401 and 1402 respectively. On the other hand, when the logical volume 131 is inheriting no unit serial number of the virtualization apparatus 13 and other related information from the migration source, the unit serial number of the virtualization apparatus 13 for storing the logical volume 131 and the volume number 301 within virtualization apparatus of the logical volume 131 are registered in the areas 1401 and 1402 respectively.

In the example of FIG. 14, VOL-C is inheriting the unit serial number "U1" and the volume number "VOL-B". Thus, "U1" and "VOL-B" are registered in the areas 1401 and 1402 respectively.

The areas 1403 and 1404 are assigned to blank areas in the conventional inquiry information.

When the logical volume 131 is not inheriting the unit serial number of the virtualization apparatus 13 and other related information from the migration source, the areas 1403 and 1404 are blank.

When the logical volume 131 is inheriting the unit serial number of the virtualization apparatus 13 and other related information from the migration source, the unit serial number of the virtualization apparatus 13 for storing the logical volume 131 and the volume number 301 within virtualization apparatus of the logical volume 131 are registered in the areas 1401 and 1402 respectively.

In the example of FIG. 14, VOL-C is inheriting the unit serial number "U1" and other related information. Thus, the unit serial number "U2" of the virtualization apparatus 13B for storing VOL-C and the volume number "VOL-C" of VOL-C are registered in the areas 1403 and 1404 respectively. Hereinafter, the areas 1401 and 1402 are referred to as the "conventional areas". The areas 1403 and 1404 are referred to as the "extension areas".

The path management program 125 of the embodiment refers to the conventional areas of the inquiry information 1400. As a result, similarly to the first and second embodiments, the AP 123 can access the file on VOL-C without changing the setting of the host computer 12.

On the other hand, the management software 128 of the embodiment refers to the extension areas of the inquiry information 1400. As a result, the management software 128 can execute the setting change in the virtualization apparatus 13B using the function that the new model virtualization apparatus 13B includes.

Hereinafter, the processes that the individual programs of the embodiment execute will be described.

The processes that the FS 124, path management program 125 and volume management program 137 of the embodiment execute are the same as those of the first embodiment, so that the description thereof will be omitted.

Figure 15:
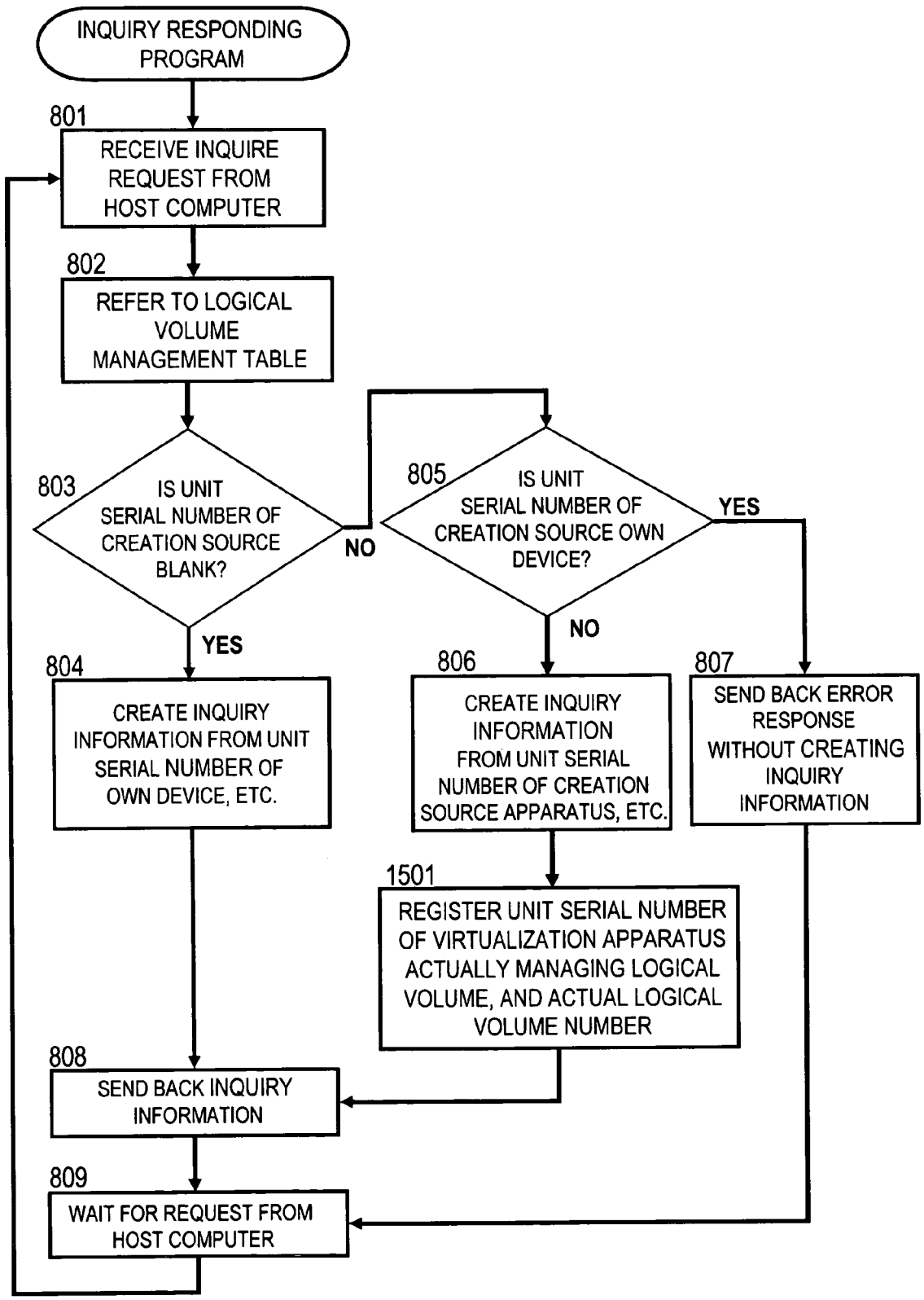
FIG. 15 is a flowchart showing the process of an inquiry responding program of the third embodiment of this invention.

FIG. 15 is a flowchart showing the process of the inquiry responding program 136 of the third embodiment of this invention.

Of the process in the inquiry responding program 136 of the embodiment, Steps 801 to 809 are the same as Steps 801 to 809 in the inquiry responding program 136 of the first embodiment of this invention. Thereby, the description of these steps will be omitted. It is to be noted that the inquiry responding program 136 creates the inquiry information 1400 in Steps 804 and 806. Further, the inquiry responding program 136 sends out the inquiry information 1400 in Step 808.

Upon completion of Step 806, the inquiry responding program 136 of the embodiment registers the unit serial number of the virtualization apparatus 13 actually managing the logical volume 131 and the volume number of the logical volume 131 as the target of the inquiry request, in the extension areas of the inquiry information 1400 (step 1501).

For example, when the virtualization apparatus 13B receives the inquiry request relative to VOL-C from the host computer 12, VOL-C is the migration destination of VOL-B of the virtualization apparatus 13A. In this case, the logical volume management table 138 of the virtualization apparatus 13B is as shown in FIG. 3B. In this case, the inquiry responding program 136 of the embodiment registers the unit serial number "U2" of the virtualization apparatus 13B for managing VOL-C, in the area 1403. Further, the inquiry responding program 136 registers the volume number "VOL-C" of VOL-C in the area 1404.

Figure 16:
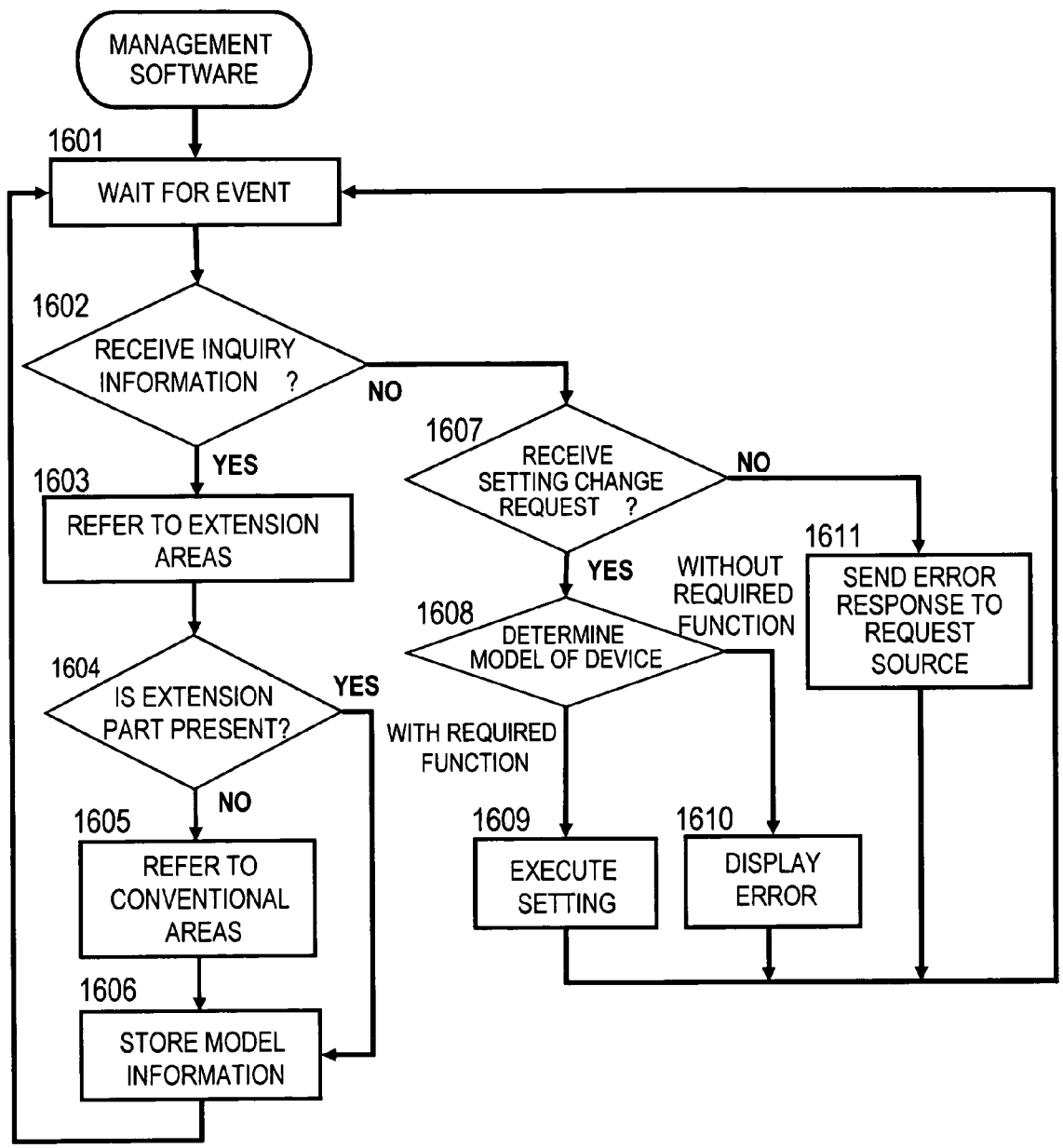
FIG. 16 is a flowchart showing the process of management software of the third embodiment of this invention.

FIG. 16 is a flowchart showing the process of the management software 128 of the third embodiment of this invention.

Upon starting execution, the management software 128 waits for an event (Step 1601).

When any event occurs, the management software 128 determines whether or not the occurring event is the reception of the inquiry information (Step 1602).

In Step 1602, when the management software 128 determines that the occurring event is the reception of the inquiry information, the host computer 12 receives the inquiry information 1400. The inquiry information 1400 is sent as a response to the inquiry request that the host computer 12 has issued relative to any of the logical volumes 131 of either of the virtualization apparatuses 13. In this case, the management software 128 refers to the extension areas of the received inquiry information 1400 (Step 1603).

It should be noted that, in the description of FIG. 16, the virtualization apparatus 13 as the destination of the above described inquiry request will be referred to as the "target virtualization apparatus 13", the logical volume 131 as the target of the inquiry request is referred to as the "target logical volume 131".

Next, the management software 128 determines whether or not the extension areas are present (Step 1604). For example, the management software 128 determines that the extension areas are present with the valid values registered in the extension areas.

In Step 1604, when the management software 128 determines that the extension areas are present, the target logical volume 131 is inheriting the unit serial number and other related information from another logical volume 131. In other words, the unit serial number and other related information inherited from the migration source are registered in the conventional areas of the inquiry information 1400, and the unit serial number of the target virtualization apparatus 13 and the volume number of the target logical volume 131 are registered in the extension areas.

Thus, the management software 128 reads the model information included in the unit serial number of the target virtualization apparatus 13 registered in the extension area. Then, the management software 128 stores the read model information in a predetermined area (not shown) of the host computer 12 (Step 1606).

On the other hand, in Step 1604, when the management software 128 determines that no extension area is present, the target logical volume 131 is not inheriting the unit serial number and other related information from another logical volume 131. In other words, the unit serial number of the target virtualization apparatus 13 and the volume number of the target logical volume 131 are registered in the conventional areas of the inquiry information 1400.

Thus, the management software 128 refers to the conventional areas of the inquiry information 1400 (Step 1605). Then, the management software 128 reads the model information included in the unit serial number of the target virtualization apparatus 13 registered in the conventional area.

Next, the management software 128 stores the read model information in a predetermined area (not shown) of the host computer 12 (Step 1606).

The management software 128 having stored the model information then returns to Step 1601.

In Step 1602, when the management software 128 determines that the occurring event is not the reception of the inquiry information, the management software 128 determines whether or not the occurring event is the reception of the setting change request (Step 1607).

When the management software 128 determines that the occurring event is not the reception of the setting change request in Step 1607, the management software 128 receives a request not executable. In this case, the management software 128 sends an error response to the request source (Step 1611), and returns to Step 1601.

On the other hand, in Step 1607, when the management software 128 determines that the occurring event is the reception of the setting change request, the management software 128 receives the setting change request relative to either of the virtualization apparatuses 13 from the user of the host computer 12 or the management server 16 and the like. In this case, the management software 128 refers to the model information stored in Step 1606 to determine the model of the virtualization apparatus 13 with the setting to be changed (Step 1608).

In Step 1608, when determining that the virtualization apparatus 13 with the setting to be changed is the model including the function required to execute the setting change, the management software 128 can execute the setting change in the virtualization apparatus 13. Thereby, the management software 128 executes the setting change (Step 1609), and returns to Step 1601.

On the other hand, in Step 1608, when determining that the virtualization apparatus 13 with the setting to be changed is the model not including the function required to execute the setting change, the management software 128 cannot execute the setting change in the virtualization apparatus 13. Thereby, the management software 128 displays an error (Step 1610), and returns to Step 1601.

With the embodiment as described above, the management software 128 always refers to the unit serial number of the target virtualization apparatus 13 registered in the inquiry information and reads the model information of the target virtualization apparatus 13. Because of this feature, although the case in which the target logical volume 131 is inheriting the unit serial number of another virtualization apparatus 13, the management software 128 can determine whether or not the target virtualization apparatus 13 includes the predetermined function by itself. As a result, the management software 128 can execute the setting change using the function that the target virtualization apparatus 13 includes.

As described above, the logical volume management program 137 of the first embodiment of this invention is applied to this embodiment. However, the logical volume management program 137 of the second embodiment of this invention may also be applied to this embodiment. In this case, the management software 128 can execute the setting change using the function that the target virtualization apparatus 13 includes, even before the target logical volume 131 returns the unit serial number of another virtualization apparatus 13.

Next, a fourth embodiment of this invention will be described.

Figure 17:
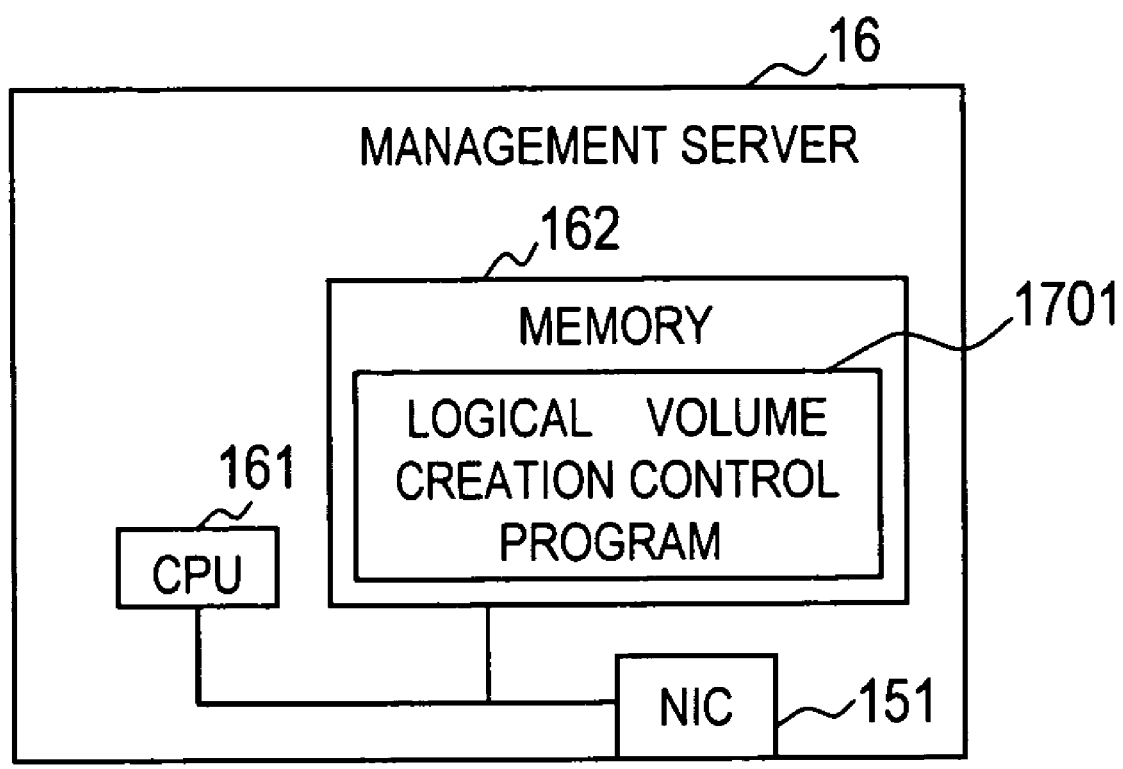
FIG. 17 is an explanatory diagram showing the configuration of a management server in a computer system of a fourth embodiment of this invention.

FIG. 17 is an illustration showing the configuration of the management server 16 in the computer system of the fourth embodiment of this invention.

It should be noted that the configuration of the parts other than the management server 16 of the computer system of the embodiment is the same as that of the first embodiment, so that the description thereof will be omitted (see FIG. 1). Further, of the management server 16, the description of the same parts as those of the management server of the first embodiment will be omitted.

The memory 162 of the management server 16 of the embodiment stores therein a logical volume creation control program 1701. The CPU 161 executes the logical volume creation control program 1701.

Figure 18:
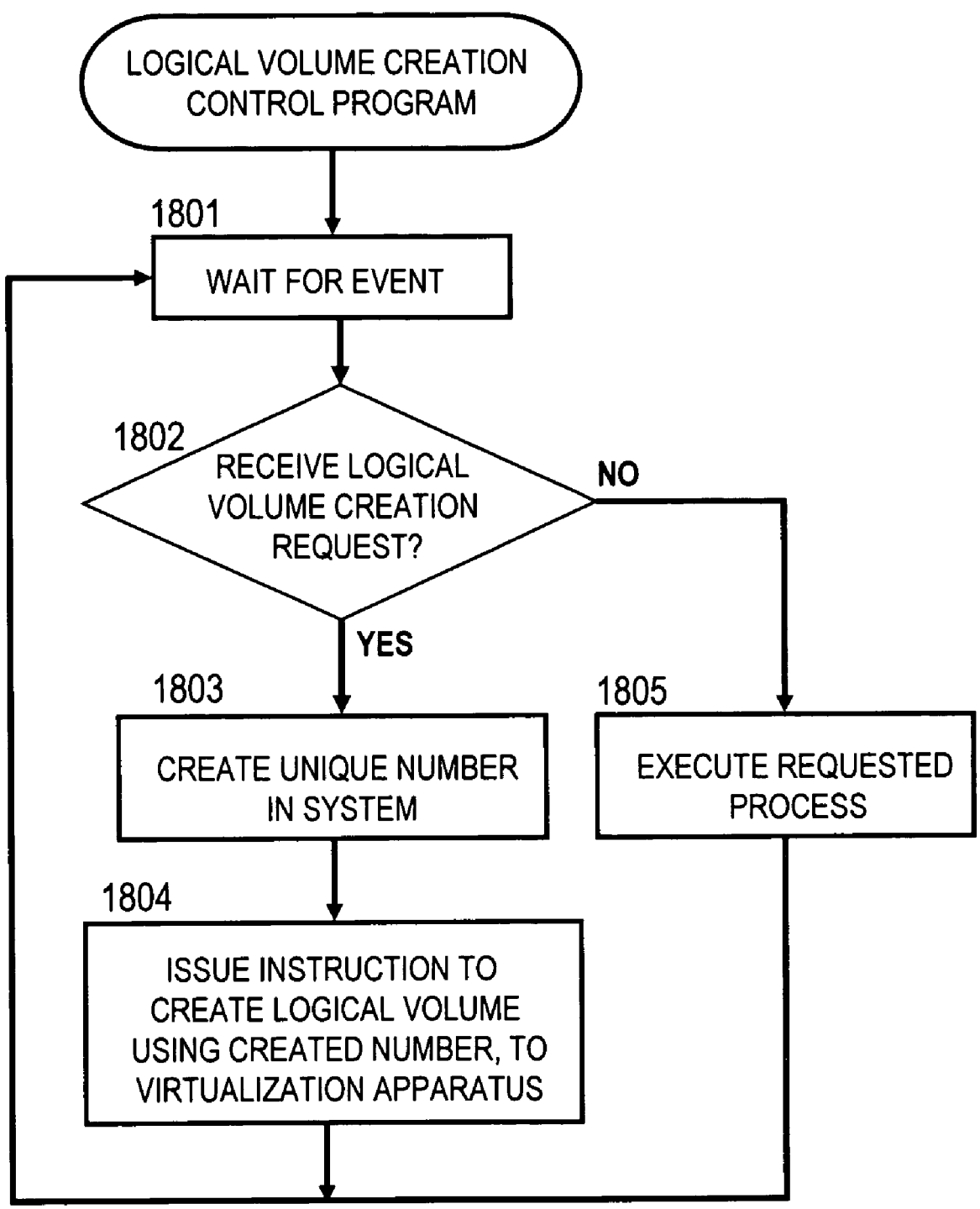
FIG. 18 is a flowchart showing the process of a logical volume creation control program of the fourth embodiment of this invention.

FIG. 18 is a flowchart showing the process of the logical volume creation control program 1701 of the fourth embodiment of this invention.

Upon starting execution, the logical volume creation control program 1701 waits for an event (Step 1801).

When any event occurs, the logical volume creation control program 1701 determines whether or not the occurring event is the reception of the logical volume creation request (Step 1802).

In Step 1802, when it is determined that the occurring event is not the reception of the logical volume creation request, the logical volume creation control program 1701 has received the request other than the logical volume creation request. In this case, the logical volume creation control program 1701 executes the requested process (Step 1805), and returns to Step 1801.

On the other hand, in Step 1802, when it is determined that the occurring event is the reception of the logical volume creation request, the logical volume creation control program 1701 has received the logical volume creation request. In this case, the logical volume creation control program 1701 creates a new volume number that is unique within the computer system (Step 1803).

Next, the logical volume creation control program 1701 issues an instruction to create a logical volume 131 using the created volume number, to the virtualization apparatus 13 (Step 1804), and returns to Step 1801.

Upon receiving the instruction, the virtualization apparatus 13 creates a new logical volume 131 and gives the volume number created in Step 1803 to the newly created logical volume 131.

The above described first to fourth embodiments of this invention, as shown in FIG. 1, will be realized in the computer system having plural virtualization apparatus 13 connecting with one or more storage systems 133 via the SAN 17. However, the embodiments may also be realized by incorporating the virtualization apparatus function into the storage system.

Figure 19:
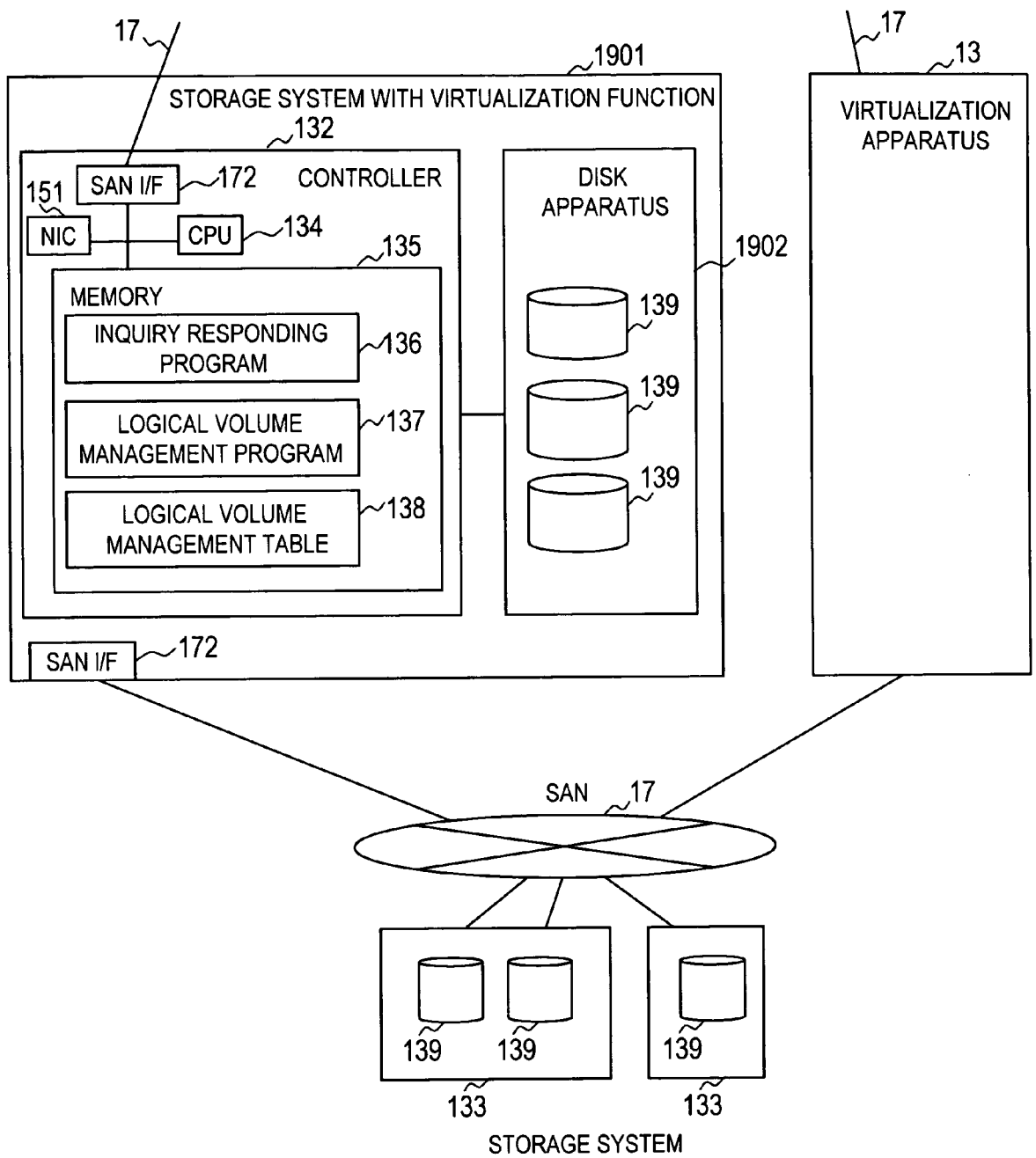
FIG. 19 is a block diagram of a computer system including a storage system into which the virtualization apparatus function is incorporated of the embodiments of this invention.

FIG. 19 is a block diagram of the computer system including the storage system into which the virtualization apparatus function is incorporated of the embodiment of this invention.

FIG. 19 shows replacing one of the virtualization apparatuses 13 of the computer system shown in FIG. 1 with a storage system with virtualization function 1901. In FIG. 19, the description of the same parts as those in FIG. 1 will be omitted. Incidentally, it is allowable to replace two or more or all of the virtualization apparatuses 13 with the storage system with virtualization function 1901.

The storage system with virtualization function 1901 connects with the host computer 12 and the management server 16 via the LAN 15 and the SAN 17, similarly to the virtualization apparatuses 13 of FIG. 1. The management server 16 connects with the management console 14. In FIG. 19, the illustration of the host computer 12, the management console 14, the LAN 15 and the management server 16 is omitted.

Further, the storage system with virtualization function 1901 connects with the storage systems 133 via the SAN 17.

The storage system with virtualization function 1901 includes the controller 132, the SAN interface (I/F) 172 and a disk apparatus 1902. Of these, the controller 132 and the SAN interface 172 are the same as those that the virtualization apparatus 13 of FIG. 1 includes, so that the description thereof will be omitted.

The disk apparatus 1902 includes one or more disk drives. These disk drives may configure a disk array. The storage area of the disk apparatus 1902 configures one or more real volumes 139.

The storage system with virtualization function 1901 provides, similarly to the virtualization apparatus 13, the logical volume 131 to the host computer 12. The logical volume 131 that the storage system with virtualization function 1901 provides may correspond to the real volume 139 on the disk apparatus 1902, or correspond to the real volume 139 on the storage system 133. The storage system with virtualization function 1901 may also provide the real volume 139 itself on the disk apparatus 1902 to the host computer 12, as the logical volume 131.

The computer system including the above described storage system with virtualization function 1901 also allows to realize the first to fourth embodiments of this invention by executing the processes described in FIGS. 2 to 18.

With the first embodiment of this invention as described above, after the migration of the logical volume 131, the migration source virtualization apparatus 13 must continue to maintain the volume number of the migrated logical volume 131 in the logical volume management table 138. This allows to maintain the uniqueness of the inquiry information.

Further, with the second embodiment of this invention, the migration destination virtualization apparatus 13 returns the volume number inherited from the migration source virtualization apparatus 13 at an appropriate time. This allows to reuse the volume number of the migrated logical volume 131 while maintaining the uniqueness of the inquiry information.

The fourth embodiment of this invention allows to give the unique volume numbers within the computer system that the management serer 16 creates, to all of the logical volumes 131 within the computer system. In other words, the volume number can be used as the identification information for uniquely identifying the logical volume 131 within the computer system without combining it with the unit serial number of the virtualization apparatus 13.

Consequently, with the fourth embodiment, the migration source virtualization apparatus 13 does not need to hold the volume number of the migrated logical volume 131 in order to maintain the uniqueness of the inquiry information. In addition, the migration destination virtualization apparatus 13 does not need to return the inherited volume number to the migration source.

What is claimed is:

1. A logical volume migration and data access control method for a computer system including a host computer, one or more storage systems, and a plurality of virtualization apparatuses,
   the host computer being coupled to the plurality of virtualization apparatuses via a network, and
   the plurality of virtualization apparatuses being coupled to the one or more storage systems via the network,
   a first virtualization apparatus of the plurality of virtualization apparatuses including a first memory and managing each of a plurality of first virtual logical volumes to which the host computer issues an access request, one of the plurality of first virtual logical volumes corresponding, to a real logical volume of a plurality of disk drives in the one or more storage systems; and
   a second virtualization apparatus of the plurality of virtualization apparatuses including a second memory and managing a second virtual logical volume to which the host computer issues an access request,
   the control method comprising:
   transferring, between the first virtualization apparatus and the second virtualization apparatus, first configuration information, which identifies a relationship between the one of the plurality of first virtual logical volumes and the real logical volume, unit serial information of the first virtualization apparatus, and first virtual logical volume identification information for virtual logical volume migration that is used during migrating the one of the plurality of first virtual logical volumes of the first virtualization apparatus into the second virtual logical volume of the second virtualization apparatus without migrating data stored on the real logical volume of the one or more storage systems, the first virtual logical volume identification information uniquely identifying the one of the plurality of first virtual logical volumes within the computer system;
   managing, by the first virtualization apparatus, first management information of the plurality of first virtual logical volumes, including information that the one of the plurality of first virtual logical volumes already has been migrated, based on the virtual logical volume migration;
   managing, by the second virtualization apparatus, second configuration information, which identifies a relationship between the second virtual logical volume and the real logical volume of the one or more storage systems, and second management information based on the virtual logical volume migration, the second management information including a relationship among the second virtual logical volume, the unit serial information of the first virtualization apparatus and the first virtual logical volume identification information;
   replying, by the first virtualization apparatus, first inquiry information, including the unit serial information of the first virtualization apparatus and another virtual logical volume identification information identifying another one of the plurality of first virtual logical volumes, if the first virtualization apparatus receives a first inquiry request of the another one of the plurality of first virtual logical volumes independent of the virtual logical volume migration;
   replying, by the first virtualization apparatus, second inquiry information, including error information, if the first virtualization apparatus receives a second inquiry request of the one of the plurality of first virtual logical volumes as a migrate source of the virtual logical volume migration; replying, by the second virtualization apparatus. third inquiry information, including the unit serial information of the first virtualization apparatus and the first virtual logical volume identification information, if the first virtualization apparatus receives a third inquiry request of the second virtual logical volume as a migrate destination of the virtual logical volume migration; and
   accessing the real logical volume via the second virtual logical volume after the virtual logical volume migration without changing the first virtual logical volume identification information presented to the host computer.

2. The control method according to claim 1, further comprising:
   storing, in the first memory, the first management information, and
   storing, in the second memory, the second management information.

3. The control method according to claim 2, further comprising: returning the first virtual logical volume identification information to the first virtualization apparatus from the second virtualization apparatus,
   deleting the unit serial information of the first virtualization apparatus from the second memory, and
   deleting the first management information from the first memory after the first virtualization apparatus has received the first virtual logical volume identification information.

4. The control method according to claim 1, further comprising:

creating a first virtual volume number that uniquely identifies the first virtual logical volume within the computer system and the second virtual volume number that uniquely identifies the second virtual logical volume within the computer system, wherein the first virtual logical volume identification information includes the first virtual volume number.

5. A virtualization apparatus being adapted to be coupled to a host computer via a network, the virtualization apparatus being further adapted to be coupled to one or more storage systems and another virtualization apparatus via the network, the another virtualization apparatus managing each of a plurality of first virtual logical volumes to which the host computer issues an access request, one of the plurality of first virtual logical volumes corresponding to a real logical volume of a plurality of disk drives in the one or more storage systems, comprising:

an interface being adapted to be coupled to the network;

a processor coupled to the interface; and a memory coupled to the processor, wherein the virtualization apparatus manages a second virtual logical volume to which the host computer issues an access request, wherein the processor controls to perform processes of receiving, from the another virtualization apparatus, first configuration information, which identifies a relationship between the one of the plurality of first virtual logical volumes and the real logical volume, unit serial information of the another virtualization apparatus, and first virtual logical volume identification information for virtual logical volume migration that is used during migrating the one of the plurality of first virtual logical volumes of the another virtualization apparatus into the second virtual logical volume of the virtualization apparatus without migrating data stored on the real logical volume of the one or more storage systems, the first virtual logical volume identification information uniquely identifying the one of the plurality of first virtual logical volumes, managing second configuration information, which identifies a relationship between the second virtual logical volume and the real logical volume of the one or more storage systems, and management information based on the virtual logical volume migration, the management information including a relationship among the second virtual logical volume, the unit serial information of the another virtualization apparatus and the first virtual logical volume identification information, replying first inquiry information, including the unit serial information of the another virtualization apparatus and the first virtual logical volume identification information, if the virtualization apparatus receives a first inquiry request of the second virtual logical volume as a migrate destination of the virtual logical volume migration, whereas the another virtualization apparatus replies second inquiry information, including the unit serial information of the another virtualization apparatus and another virtual logical volume identification information identifying another one of the plurality of first virtual logical volumes, if the another virtualization apparatus receives a second inquiry request of the another one of the plurality of first virtual logical volumes independent of the virtual logical volume migration, and the another virtualization apparatus replies third inquiry information, including error information, if the another virtualization apparatus receives a third inquiry request of the one of the plurality of first virtual logical volumes as a migrate source of the virtual logical volume migration, and accessing the real logical volume via the second virtual logical volume of the one or more storage systems without changing the first virtual logical volume identification information presented to the host computer.

6. The virtualization apparatus according to claim 5, wherein the processor receives and stores, in the memory, the first virtual logical volume identification information.

7. The virtualization apparatus according to claim 6, wherein the processor sends the first virtual logical volume identification information to the another virtualization apparatus via the interface, and deletes the unit serial information of the another virtualization apparatus from the memory.

8. The virtualization apparatus according to claim 5, wherein the first inquiry information includes a second virtual logical volume identification information that uniquely identifies the second virtual logical volume.

9. A computer system being adapted to be coupled to a host computer and one or more storage systems, the computer system comprising:

a first virtualization apparatus including a first interface coupled to the network, a first processor coupled to the first interface and managing each of a plurality of first virtual logical volumes to which the host computer issues an access request, and a first memory coupled to the first processor, one of the plurality of first virtual logical volumes corresponding to a real logical volume of a plurality of disk drives in the one or more storage systems; and a second virtualization apparatus including a second interface coupled to the network, a second processor coupled to the interface and managing a second virtual logical volume to which the host computer issues an access request, and a second memory coupled to the second processor, wherein the first virtualization apparatus transfers, to the second virtualization apparatus, first configuration information, which identifies a relationship between the one of the plurality of first virtual logical volumes and the real logical volume, unit serial information of the first virtualization apparatus, and first virtual logical volume identification information for virtual logical volume migration that is used during migrating the one of the plurality of first virtual logical volumes of the first virtualization apparatus into the second virtual logical volume of the second virtualization apparatus without migrating data stored on the real logical volume of the one or more storage systems, the first virtual logical volume identification information uniquely identifying the one of the plurality of first virtual logical volumes within the computer system, wherein the first virtualization apparatus manages first management information of the plurality of first virtual logical volumes, including information that the one of the plurality of first virtual logical volumes already has been migrated, based on the virtual logical volume migration, wherein the second virtualization apparatus manages second configuration information, which identifies a relationship between the second virtual logical volume and the real logical volume of the one or more storage systems, and second management information based on the virtual logical volume migration, the second management information including a relationship among the second virtual logical volume, the unit serial information of the first virtualization apparatus and the first virtual logical volume identification information, wherein the first virtualization apparatus replies first inquiry information, including the unit serial information of the first virtualization apparatus and another virtual logical volume identification information identifying another one of the plurality of first virtual logical volumes, if the first virtualization apparatus receives a first inquiry request of the another one of the plurality of first virtual logical volumes independent of the virtual logical volume migration, wherein the first virtualization apparatus replies second inquiry information, including error information, if the first virtualization apparatus receives a second inquiry request of the one of the plurality of first virtual logical volumes as a migrate source of the virtual logical volume migration, wherein the second virtualization apparatus replies third inquiry information, including the unit serial information of the first virtualization apparatus and the first virtual logical volume identification information, if the first virtualization apparatus receives a third inquiry request of the second virtual logical volume as a migrate destination of the virtual logical volume migration, and wherein the second virtualization apparatus accesses the real logical volume of the one or more storage systems via the second virtual logical volume without changing the first virtual logical volume identification information presented to the host computer.

10. The computer system according to claim 9,
wherein the first processor stores, in the first memory, the first management information; and
wherein the second processor stores, in the second memory, the second management information.

11. The computer system according to claim 10,
wherein the second processor sends the first virtual volume identification information to the first virtualization apparatus via the second interface, and deletes the unit serial information of the first virtualization apparatus from the second memory; and
wherein the first processor, when receiving the first virtual volume identification information from the second virtualization apparatus via the first interface, deletes the first virtual volume identification information and the unit serial information of the first virtualization apparatus from the first memory.

12. The computer system according to claim 9,
wherein the third inquiry information further includes the second identification information that uniquely identifies the second virtual logical volume within the computer system.

13. The computer system according to claim 9, further including a management server,
wherein the management server creates a the first virtual volume identification information and a second virtual logical volume identification information that uniquely identifies the second virtual logical volume within the computer system.

* * * * *

UNITED STATES PATENT AND TRADEMARK OFFICE
CERTIFICATE OF CORRECTION

PATENT NO. : 7,596,676 B2
APPLICATION NO. : 11/322126
DATED : September 29, 2009
INVENTOR(S) : Serizawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 290 days.

Signed and Sealed this

Fourteenth Day of December, 2010

David J. Kappos
*Director of the United States Patent and Trademark Office*